United States Patent
Dewey et al.

(10) Patent No.: US 11,084,487 B1
(45) Date of Patent: Aug. 10, 2021

(54) VEHICLE COLLISION ALERT SYSTEM AND METHOD FOR FACILITATING VEHICLE COLLISION AVOIDANCE

(71) Applicant: State Farm Mutual Automobile Insurance Company, Bloomington, IL (US)

(72) Inventors: Douglas L. Dewey, Bloomington, IL (US); Jon Hodel, Heyworth, IL (US); Steve F. Roberson, Normal, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 9 days.

(21) Appl. No.: 15/982,830

(22) Filed: May 17, 2018

Related U.S. Application Data

(60) Provisional application No. 62/631,191, filed on Feb. 15, 2018, provisional application No. 62/615,191, filed on Jan. 9, 2018.

(51) Int. Cl.
*B60W 30/09* (2012.01)
*B60W 40/09* (2012.01)
*B60W 50/16* (2020.01)
*G05D 1/00* (2006.01)

(52) U.S. Cl.
CPC .......... *B60W 30/09* (2013.01); *B60W 40/09* (2013.01); *B60W 50/16* (2013.01); *G05D 1/0055* (2013.01)

(58) Field of Classification Search
CPC ...... B60W 30/09; B60W 40/09; B60W 50/16; G05D 1/0055

USPC .......................................................... 701/23
See application file for complete search history.

(56) References Cited

U.S. PATENT DOCUMENTS

| | | | |
|---|---|---|---|
| 5,465,079 A | 11/1995 | Bouchard et al. | |
| 6,734,799 B2 | 5/2004 | Munch | |
| 6,763,292 B1 | 7/2004 | Smith et al. | |
| 7,227,472 B1 | 6/2007 | Roe | |
| 7,389,178 B2 | 6/2008 | Raz et al. | |
| 9,086,948 B1 * | 7/2015 | Slusar | G01S 5/0284 |
| 9,898,931 B1 | 2/2018 | Nickolaou | |
| 10,037,699 B1 | 7/2018 | Toyoda et al. | |
| 10,414,407 B1 | 9/2019 | Slusar | |
| 2006/0220915 A1 | 10/2006 | Bauer et al. | |
| 2008/0108022 A1 | 5/2008 | Freund | |

(Continued)

FOREIGN PATENT DOCUMENTS

EP          3141926 A1          3/2017

*Primary Examiner* — Marthe Y Marc-Coleman
(74) *Attorney, Agent, or Firm* — Armstrong Teasdale LLP

(57) ABSTRACT

An impairment analysis ("IA") computer system for detecting a driver or vehicle impairment to facilitate vehicle collision avoidance is provided. The IA computer system is associated with a host vehicle, and includes at least one processor in communication with at least one memory device. The at least one processor is programmed to: (i) interrogate a target vehicle via the plurality of sensors by scanning at least one of the target vehicle and a target driver of the target vehicle; (ii) receive sensor data including at least one of target driver data and target vehicle condition data; (iii) analyze the sensor data by determining at least one outlier within the sensor data; (iv) detect an impairment of at least one of the target driver and the target vehicle based upon the analysis; and/or (v) direct corrective action based upon the detected impairment.

20 Claims, 11 Drawing Sheets

(56) References Cited

U.S. PATENT DOCUMENTS

| | | | |
|---|---|---|---|
| 2010/0194593 A1* | 8/2010 | Mays | B60W 10/20 340/905 |
| 2012/0065858 A1* | 3/2012 | Nickolaou | B60Q 9/008 701/70 |
| 2013/0238181 A1* | 9/2013 | James | B60W 50/0097 701/23 |
| 2013/0268184 A1 | 10/2013 | Zagorski et al. | |
| 2014/0278574 A1 | 9/2014 | Barber | |
| 2014/0375810 A1 | 12/2014 | Rodriguez | |
| 2015/0112504 A1 | 4/2015 | Binion et al. | |
| 2015/0161894 A1 | 6/2015 | Duncan et al. | |
| 2015/0166059 A1* | 6/2015 | Ko | B60W 30/09 701/28 |
| 2015/0301172 A1 | 10/2015 | Ossowska et al. | |
| 2015/0353014 A1* | 12/2015 | Li | G08G 1/166 348/148 |
| 2016/0001781 A1* | 1/2016 | Fung | G16H 50/20 701/36 |
| 2016/0107570 A1* | 4/2016 | Modarres | B60Q 9/008 340/435 |
| 2017/0036673 A1 | 2/2017 | Lee et al. | |
| 2017/0072763 A1* | 3/2017 | Hrovat | B60G 17/0165 |
| 2017/0221362 A1 | 8/2017 | Gunaratne et al. | |
| 2018/0061253 A1 | 3/2018 | Hyun | |
| 2018/0288586 A1* | 10/2018 | Tran | G06K 9/00671 |
| 2019/0038204 A1* | 2/2019 | Beck | A61B 5/18 |
| 2019/0079529 A1 | 3/2019 | Kamata | |
| 2019/0279447 A1* | 9/2019 | Ricci | B60R 25/25 |

* cited by examiner

VEHICLE COLLISION ALERT SYSTEM AND METHOD FOR FACILITATING VEHICLE COLLISION AVOIDANCE

CROSS-REFERENCE TO RELATED APPLICATIONS

This application claims the benefit of priority to U.S. Provisional Patent Application No. 62/615,191, filed Jan. 9, 2018, entitled "VEHICLE COLLISION ALERT SYSTEM AND METHOD," and U.S. Provisional Patent Application No. 62/631,191, filed Feb. 15, 2018, entitled "VEHICLE COLLISION ALERT SYSTEM AND METHOD," the entire contents and disclosure of which are hereby incorporated by reference herein in their entirety.

FIELD OF THE INVENTION

The present disclosure relates to implementing a vehicle collision alert system and, more particularly, to a network based system and method for alerting at least a first driver to impaired second drivers and/or impaired vehicles to avoid collisions.

BACKGROUND

Vehicle collisions due to driving behavior such as impaired driving are widespread. For example, many vehicle accidents occur due to drivers being distracted (e.g., texting, talking on the phone), drowsy, and/or under the influence of drugs or alcohol. Vehicle accidents caused by vehicle malfunction, such as steering and braking problems, are also prevalent. Poor driving behavior (e.g., distracted driving) and improper vehicle conditions place other drivers at risk every day. For example, a safe driver operating a brand new vehicle may be involved in an accident due to an impaired driver of another vehicle. Vehicle accidents may be costly, time consuming, and in serious cases, fatal.

Although many vehicles include safety features designed to prevent collisions, these systems may be generally based upon monitoring the vehicle operator's own driving behavior (e.g., lane departure warning and lane-keeping assist systems). Some safety features are used or deployed when a vehicle accident occurs (e.g., airbags, inflatable seat belts). Furthermore, vehicles possessing autonomous or semi-autonomous technology or functionality may reduce the risk of vehicle accidents due to an operator's own driving behavior. However, these vehicles may be susceptible to causing accidents due to vehicle malfunction (e.g., engine software problems). Therefore, there exists a need for a vehicle collision alert system that may alert a driver to impaired drivers and/or impaired vehicles in the driver's vicinity to facilitate taking preventative measures to avoid vehicle collisions.

BRIEF SUMMARY

The present embodiments may relate to systems and methods for determining impaired drivers and/or impaired vehicles in real time, and generating an alert signal based upon captured data. The system may include an impairment analysis ("IA") computer system associated with a host vehicle (e.g., first vehicle), a plurality of sensors on the host vehicle, one or more user computer devices, a host vehicle controller, a target vehicle (e.g., second vehicle) controller, and one or more insurance network computer devices. The IA computer system may be configured to: (i) interrogate a target vehicle by using a plurality of sensors associated with a host vehicle including scanning the target vehicle and a target driver; (ii) receive sensor data including target driver data and target vehicle condition data; (iii) analyze the sensor data by applying a baseline model to the sensor data; (iv) detect an impairment with the target driver or the target vehicle based upon the analysis; and/or (v) output an alert signal to at least a host vehicle controller based upon detecting the impairment.

In one aspect, an impairment analysis ("IA") computer system for detecting a driver or vehicle impairment to facilitate vehicle collision avoidance may be provided. The IA computer system may be associated with a host vehicle. The IA computer system may include a plurality of sensors, and at least one processor in communication with the plurality of sensors and at least one memory device. The at least one processor may be programmed to: (i) interrogate a target vehicle via the plurality of sensors by scanning at least one of the target vehicle and a target driver of the target vehicle; (ii) receive sensor data including at least one of target driver data and target vehicle condition data; (iii) analyze the sensor data by determining at least one outlier within the sensor data; (iv) detect an impairment of at least one of the target driver and the target vehicle based upon the analysis; and/or (v) direct corrective action based upon the impairment of the at least one of the target driver and the target vehicle. The computer system may include additional, less, or alternative functionality, including that discussed elsewhere herein.

In another aspect, a computer-implemented method for detecting an impairment may be provided. The method may be implemented using an impairment analysis ("IA") computing device associated with a host vehicle. The IA computing device may include at least one processor in communication with at least one memory device. The method may include: (i) interrogating, by the IA computing device, a target vehicle by using a plurality of sensors included on a host vehicle to scan at least one of a target vehicle and a target driver; (ii) receiving, by the IA computing device, sensor data including at least one of target driver data and target vehicle condition data; (iii) analyzing, by the IA computing device, by determining at least one outlier within the sensor data; (iv) detecting, by the IA computing device, an impairment of at least one of the target driver and the target vehicle based upon the analysis; and/or (v) directing, by the IA computing device, corrective action based upon the impairment of the at least one of the target driver and the target vehicle. The method may include additional, less, or alternative actions, including those discussed elsewhere herein.

In a further aspect, at least one non-transitory computer-readable storage media having computer-executable instructions embodied thereon for detecting a driver and/or vehicle impairment to facilitate vehicle collision avoidance may be provided. When executed by at least one processor, the computer-executable instructions may cause the at least one processor to: (1) interrogate a target vehicle via a plurality of sensors by scanning at least one of the target vehicle and a target driver of the target vehicle; (2) receive sensor data including at least one of target driver data and target vehicle condition data; (3) analyze the sensor data by determining at least one outlier within the sensor data; (4) detect an impairment of at least one of the target driver and the target vehicle based upon the analysis; and/or (5) direct corrective action based upon the impairment of the at least one of the target driver and the target vehicle. The storage media may include or direct additional, less, or alternate actions, including those discussed elsewhere herein.

In another aspect, an impairment analysis ("IA") computer system for detecting an impairment with a target vehicle or target driver may be provided. The IA computer system may be associated with a host vehicle. The IA computer system may include a plurality of sensors. In some exemplary embodiments, the IA computer system may include an IA computing device that includes at least one processor in communication with at least one memory device. The at least one processor may be programmed to: (i) interrogate (or scan) a target vehicle by using a plurality of sensors associated with a host vehicle including scanning the target vehicle and/or a target driver; (ii) receive sensor data including target driver data and/or target vehicle condition data; (iii) analyze the sensor data by applying a baseline model to the sensor data; (iv) detect an impairment with the target driver and/or the target vehicle based upon the analysis; and/or (v) output an alert signal to at least a host vehicle controller, or directing taking other corrective action (such as in the case of an autonomous vehicle) based upon detecting that the target driver and/or target vehicle is impaired. The computer system may include additional, less, or alternate functionality, including that discussed elsewhere herein.

In another aspect, a computer-implemented method for detecting an impairment with a target vehicle or target driver may be provided. The method may be implemented using an impairment analysis ("IA") computing device associated with a host vehicle. The IA computing device may include at least one processor in communication with at least one memory device. The method may include: (i) interrogating (or scan), by the IA computing device, a target vehicle by using a plurality of sensors associated with a host vehicle including scanning the target vehicle and/or a target driver; (ii) receiving, by the IA computing device, sensor data including target driver data and/or target vehicle condition data; (iii) analyzing, by the IA computing device, the sensor data by applying a baseline model to the sensor data; (iv) detecting, by the IA computing device, an impairment with the target driver and/or the target vehicle based upon the analysis; and/or (v) outputting, by the IA computing device, an alert signal to at least a host vehicle controller (or directing other corrective or vehicle collision preventive actions) based upon detecting that the target driver and/or target vehicle is impaired. The method may include additional, less, or alternate functionality, including those discussed elsewhere herein.

In a further aspect, at least one non-transitory computer-readable storage media having computer-executable instructions embodied thereon may be provided. When executed by at least one processor, the computer-executable instructions may cause the at least one processor to: (i) interrogate a target vehicle by using a plurality of sensors associated with a host vehicle including scanning the target vehicle and/or a target driver; (ii) receive sensor data including target driver data and/or target vehicle condition data; (iii) analyze the sensor data by applying a baseline model to the sensor data; (iv) detect an impairment with the target driver and/or the target vehicle based upon the analysis; and/or (v) output an alert signal to at least a host vehicle controller, or direct corrective or collision preventive driver or vehicle actions, based upon detecting that the target driver and/or target vehicle is impaired. The storage media may include additional, less, or alternate actions, including those discussed elsewhere herein.

In another aspect, an impairment analysis ("IA") computer system for alerting a first driver of a first vehicle, or the first vehicle (such as autonomous vehicle) to a driving hazard posed by a second vehicle operated by a second driver may be provided. The IA computer system may be associated with the first vehicle. In some exemplary embodiments, the IA computer system may include an IA computing device that includes at least one processor in communication with at least one memory device. The at least one processor may be programmed to: (i) receive second vehicle data including second driver data and/or second vehicle condition data, wherein the second vehicle data is collected by a plurality of sensors associated with the first vehicle; (ii) analyze the second vehicle data by applying a baseline model to the second vehicle data; (iii) determine that the second vehicle poses a driving hazard to the first vehicle based upon the analysis; and/or (iv) generate an alert signal, or direct preventive actions (such as in the case that the first vehicle is an autonomous vehicle), based upon the determination that the second driver or second vehicle poses a driving hazard to the first vehicle. The computer system may include additional, less, or alternative functionality, including that discussed elsewhere herein.

In yet another aspect, a computer-implemented method for alerting a first driver of a first vehicle, or the first vehicle (such as an autonomous vehicle) to a driving hazard posed by a second vehicle operated by a second driver may be provided. The method may be implemented using an impairment analysis ("IA") computing device associated with the first vehicle. The IA computing device may include at least one processor in communication with at least one memory device. The method may include: (i) receiving, by the IA computing device, second vehicle data including second driver data and/or second vehicle condition data, that is collected by a plurality of sensors associated with the first vehicle; (ii) analyzing, by the IA computing device, the second vehicle data by applying a baseline model to the second vehicle data; (iii) determining, by the IA computing device, that the second vehicle poses a driving hazard to the first vehicle based upon the analysis; and/or (iv) generating, by the IA computing device, an alert signal, or directing corrective action (such as in the case that the first vehicle is an autonomous vehicle), based upon the determination that the second vehicle poses a driving hazard to the first vehicle. The method may include additional, less, or alternative actions, including those discussed elsewhere herein.

In another aspect, at least one non-transitory computer-readable storage media having computer-executable instructions embodied thereon may be provided. When executed by at least one processor, the computer-executable instructions may cause the at least one processor to: (i) receive second vehicle data including second driver data and second vehicle condition data, wherein the second vehicle data is collected by a plurality of sensors associated with the first vehicle; (ii) analyze the second vehicle data by applying a baseline model to the second vehicle data; (iii) determine that the second vehicle poses a driving hazard to the first vehicle based upon the analysis; and/or (iv) generate an alert signal, or direct other corrective action, based upon the determination that the second vehicle poses a driving hazard to the first vehicle. The storage media may include or direct additional, less, or alternate actions, including those discussed elsewhere herein.

Ina further aspect, an impairment analysis ("IA") computer system for detecting a driver or vehicle (including an autonomous or semi-autonomous vehicle) impairment with a target vehicle or target driver may be provided. The IA computer system may be associated with a host vehicle. The IA computer system may further include a plurality of sensors. In some exemplary embodiments, the IA computer system may include an IA computing device that includes at least one processor in communication with at least one memory device. The at least one processor may be programmed to: (i) interrogate a target vehicle, wherein the target vehicle operates in at least one of a semi-autonomous control mode and/or an autonomous control mode, and wherein the target vehicle is capable of wirelessly communicating with the host vehicle; (ii) receive, from the target vehicle, sensor data including target driver data and/or target vehicle condition data; (iii) analyze the sensor data by applying a baseline model to the sensor data; (iv) detect an impairment of the target driver and/or target vehicle based upon the analysis; and/or (v) output an alert signal to a host vehicle controller, or direct other corrective vehicle action (such as in the case of autonomous or semi-autonomous vehicle), based upon detecting that the target driver or target vehicle is impaired. The computer system may include additional, less, or alternative functionality, including that discussed elsewhere herein.

In another aspect, a computer-implemented method for detecting an impairment with a target vehicle or target driver may be provided. The method may be implemented using an impairment analysis ("IA") computing device associated with a host vehicle. The IA computing device may include at least one processor in communication with at least one memory device. The method may include: (i) interrogating, by the IA computing device, a target vehicle, wherein the target vehicle operates in at least one of a semi-autonomous control mode and/or an autonomous control mode, and wherein the target vehicle is capable of wirelessly communicating with the host vehicle; (ii) receiving, from the target vehicle, sensor data including target driver data and/or target vehicle condition data; (iii) analyzing, by the IA computing device, the sensor data by applying a baseline model to the sensor data; (iv) detecting, by the IA computing device, an impairment of the target driver or target vehicle based upon the analysis; and/or (v) outputting, by the IA computing device, an alert signal to a host vehicle controller, or directing other corrective or collision preventive vehicle action (such as in the case of an autonomous or semi-autonomous vehicle), based upon detecting that the target driver and/or target vehicle is impaired. The method may include additional, less, or alternate actions, including those discussed elsewhere herein.

In yet another aspect, at least one non-transitory computer-readable storage media having computer-executable instructions embodied thereon may be provided. When executed by at least one processor, the computer-executable instructions may cause the at least one processor to: (i) interrogate a target vehicle, wherein the target vehicle operates in at least one of a semi-autonomous control mode and an autonomous control mode, and wherein the target vehicle is capable of wirelessly communicating with a host vehicle; (ii) receive, from the target vehicle, sensor data including target driver data and/or target vehicle condition data; (iii) analyze the sensor data by applying a baseline model to the sensor data; (iv) detect an impairment of the target driver and/or target vehicle based upon the analysis; and/or (v) output an alert signal to a host vehicle controller, or direct taking other vehicle collision preventive actions, based upon detecting that the target driver and/or target vehicle is impaired. The instructions may direct additional, less, or alternate functionality or actions, including those discussed elsewhere herein.

In a further aspect, a computer system for collecting real-time impaired driving data may be provided. The computer system may be associated with a host vehicle. The computer system may further include a plurality of sensors. The computer system may include at least one processor in communication with the plurality of sensors and at least one memory device. The at least one processor may be programmed to: (i) interrogate a target vehicle via the plurality of sensors by scanning the target vehicle and/or a target driver of the target vehicle; (ii) receive sensor data including target driver data and/or target vehicle condition data; (iii) analyze the sensor data by applying a baseline model to the sensor data; (iv) detect an impairment of the target driver and/or target vehicle based upon the analysis, wherein the impairment is one of at least a high-risk impairment and a low-risk impairment; and/or (v) transmit the detected impairment to a remote-computing device to update an insurance policy of an insurance holder. The computer system may include additional, less, or alternate functionality, including that discussed elsewhere herein.

In another aspect, a computer-implemented method for collecting real-time impaired driving data may be provided. The method may be implemented using a computing device associated with a host vehicle. The computing device may include at least one processor in communication with at least one memory device. The method may include: (i) interrogating, by the computing device, a target vehicle by using a plurality of sensors included on a host vehicle to scan a target vehicle and/or a target driver; (ii) receiving, by the computing device, sensor data including target driver data and/or target vehicle condition data; (iii) analyzing, by the computing device, the sensor data by applying a baseline model to the sensor data; (iv) detecting, by the computing device, an impairment of the target driver and/or target vehicle based upon the analysis, wherein the impairment is one of at least a high-risk impairment and a low-risk impairment; and/or (v) transmitting, by the computing device, the detected impairment to a remote-computing device to update an insurance policy of an insurance holder. The method may include additional, less, or alternate actions, including those discussed elsewhere herein.

In yet another aspect, at least one non-transitory computer-readable storage media having computer-executable instructions embodied thereon may be provided. When executed by at least one processor, the computer-executable instructions may cause the at least one processor to: (i) interrogate a target vehicle by using a plurality of sensors included on a host vehicle to scan a target vehicle and/or a target driver; (ii) receive sensor data including target driver data and/or target vehicle condition data; (iii) analyze the sensor data by applying a baseline model to the sensor data; (iv) detect an impairment of the target driver or target vehicle based upon the analysis, wherein the impairment is one of at least a high-risk impairment and a low-risk impairment; and/or (v) transmit the detected impairment to a remote-computing device to update an insurance policy of an insurance holder. The instructions may direct additional, less, or alternate actions or functionality, including that discussed elsewhere herein.

In another aspect, an impairment analysis ("IA") computer system for detecting a driver or vehicle impairment may be provided. The IA computer system may be associated with a host vehicle. The IA computer system may include a plurality of sensors. In some exemplary embodiments, the IA computer system may include an IA computing device that includes at least one processor in communication with the plurality of sensors and at least one memory device. The at least one processor may be programmed to: (i) interrogate a target vehicle via the plurality of sensors by scanning at least one of the target vehicle and a target driver of the target vehicle; (ii) receive sensor data including at least one of target driver data and target vehicle condition data; (iii) analyze the sensor data to determine whether at least one of lane drift and vehicle speed deviation for the target vehicle exceeds a respective threshold; (iv) detect an impairment of at least one of the target driver and the target vehicle based upon the analysis; and/or (v) direct collision avoidance action based upon the detection. The computer system may include additional, less, or alternate functionality, including that discussed elsewhere herein.

In another aspect, a computer-implemented method for detecting an impairment may be provided. The method may be implemented using an impairment analysis ("IA") computing device associated with a host vehicle. The IA computing device may include at least one processor in communication with at least one memory device. The method may include: (i) interrogating, by the IA computing device, a target vehicle by using a plurality of sensors included on a host vehicle to scan at least one of target vehicle and a target driver; (ii) receiving, by the IA computing device, sensor data including at least one of target driver data and target vehicle condition data; (iii) analyzing, by the IA computing device, the sensor data to detect at least one of lane departure and speed deviation for the target vehicle; (iv) determining, by the IA computing device, that the at least one of lane departure and speed deviation for the target vehicle is above a respective predetermined threshold; and/or (v) directing, by the IA computing device, collision avoidance action based upon the determination. The method may include additional, less, or alternative actions, including those discussed elsewhere herein.

In yet another aspect, an impairment analysis ("IA") computer system for alerting a target driver of a target vehicle to a driving hazard posed by a host vehicle operated by a host driver may be provided. The IA computer system may be associated with the host vehicle. The IA computer system may include at least one processor in communication with at least one memory device, the at least one processor may be programmed to: (i) gather sensor data at the host vehicle, wherein the sensor data includes data associated with the host vehicle and the host driver, and wherein the sensor data is collected by a plurality of sensors included on the host vehicle; (ii) analyze the sensor data by applying a baseline model to the sensor data; (iii) determine, based upon the analysis, that the host vehicle poses a risk to the target vehicle; and/or (iv) output an alert message to the target vehicle, wherein the alert message includes sensor data enabling the target vehicle to determine corrective action. The storage media may include or direct additional, less, or alternate actions, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
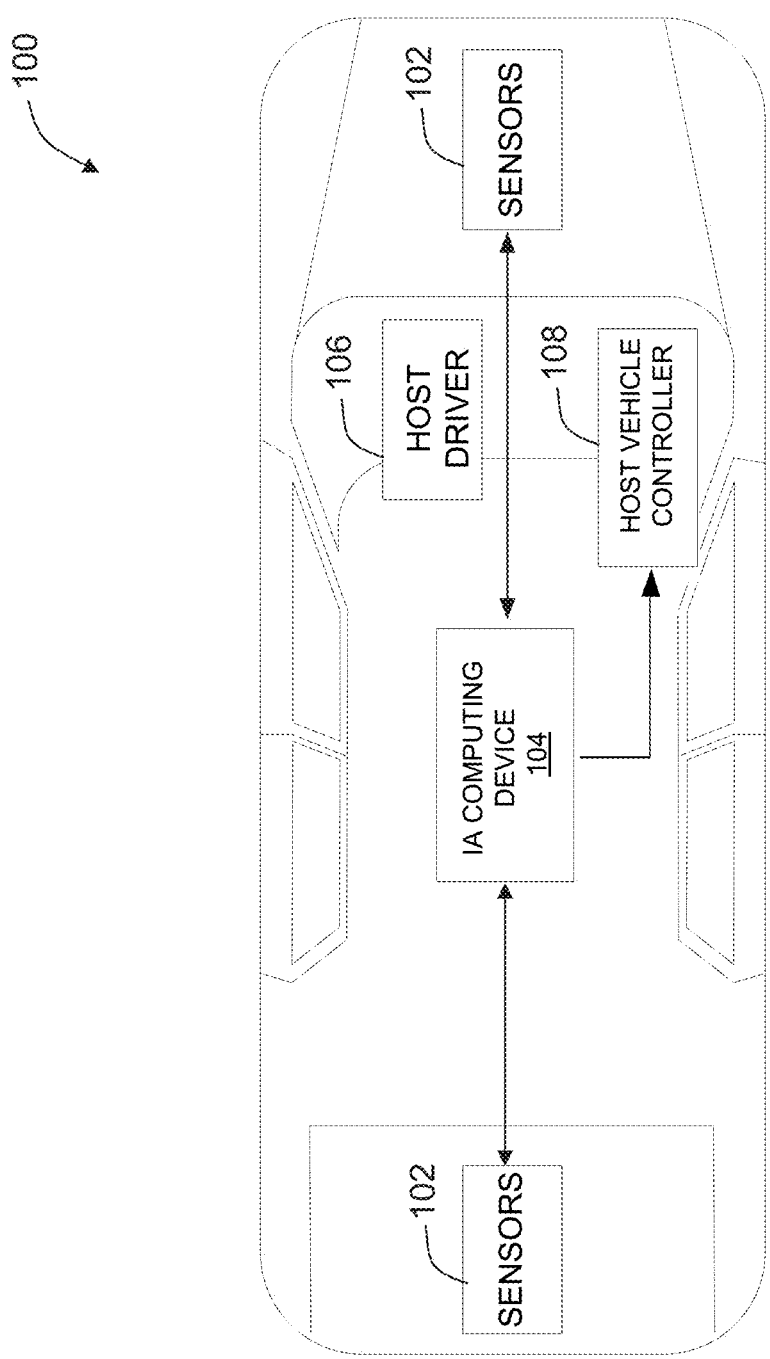
FIG. 1 illustrates a schematic diagram of an exemplary host vehicle having an impairment analysis (IA) computing device.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for capturing real time driving related data to generate alerts and prevent vehicle collisions. In one exemplary embodiment, the methods may be performed by an impairment analysis ("IA") computing device.

In the exemplary embodiment, the IA computing device may be associated with a host vehicle (e.g., first vehicle). The IA computing device may be located in the host vehicle. In some embodiments, the IA computing device may be accessed remotely. The IA computing device may interrogate a target vehicle (e.g., second vehicle, such as an oncoming or approaching vehicle) by using a plurality of sensors included on, or associated with, the host vehicle for scanning the target vehicle and a target driver (e.g., second driver).

The sensors may include, but are not limited to radar, LIDAR, Global Positioning System (GPS), video devices, imaging devices, cameras (e.g., 2D and 3D cameras), and audio recorders. The sensors may be positioned on the exterior and/or interior of the host vehicle. In some embodiments, some of the sensors may be integrated into the host vehicle (e.g., tire pressure sensors), or may be attached to the host vehicle.

In the exemplary embodiment, the host vehicle may be equipped with a plurality of cameras, or other image sensors. A front view camera may be positioned near the front of the host vehicle to capture data of oncoming traffic. Side view cameras may also be positioned near the driver side and passenger side of the host vehicle to capture data of parallel traffic. Additionally or alternatively, a rear view camera may be positioned at the rear of the host vehicle to capture data of traffic approaching from the back. In the exemplary embodiment, the plurality of cameras (e.g., front view and side view cameras) may be used with different types of sensors to acquire quality data necessary for the IA computing device to detect impairment. In the exemplary embodiment, the cameras capture continuous video data of oncoming and parallel traffic when the ignition of the host vehicle is on.

In the exemplary embodiment, the IA computing device may receive sensor data (e.g., second vehicle data) from a plurality of sensors included on the host vehicle. The sensor data may include target driver data of a target driver (e.g., second vehicle driver) and target vehicle condition data of the target vehicle (e.g., second vehicle). Target driver data may include information associated with the target driver, and may include positional data, such as head orientation, body posture, neck position, and eye movement. Target driver data may also include information as to driving behavior, such as vehicle lane maintenance (e.g., lane drifting), braking, and gap distance between the host vehicle and the target vehicle.

Target vehicle condition data may include information associated with the target vehicle, and may include information as to vehicle maintenance (e.g., dashboard indicator lights/messages), engine condition (e.g., abnormal engine noise), and road condition (e.g., tire pressure variation due to road conditions). In addition to target driver data and target vehicle condition data, sensor data may generally include information as to steering input, speed maintenance (e.g., failure to maintain speed, speeding in excess of the posted speed limit), acceleration, deceleration, lane position, and abnormal variation in a dampening of a shock absorber. The conditions may be sensed by the plurality of sensors. In other embodiments, the host vehicle may acquire sensor data from the plurality of sensors on the host vehicle, as well as from sensors on the target vehicle. In one embodiment, lane drift or variation in speed may be detected by sensors mounted on the host or target vehicles, and may indicate driver drowsiness or distraction.

In some embodiments, the host vehicle and the target vehicle may have autonomous or semi-autonomous vehicle-related functionalities that enable vehicle-to-vehicle (V2V) wireless communication. In these embodiments, the IA computing device of the host vehicle may receive target vehicle condition data and/or target driver data directly from the target vehicle, such as via one or more radio frequency links. For example, a target vehicle controller of the target vehicle may detect that its operator (e.g., target driver) is impaired. The target vehicle controller may broadcast an alert signal to the V2V communication network, which may be received by the host vehicle. In this embodiment, the alert signal broadcast from the target vehicle may be received at a wireless communications device of the host vehicle.

In the exemplary embodiment, the IA computing device may analyze the sensor data by applying a baseline model to the sensor data. The baseline model may include baseline conditions that represent safe driving conditions and standard vehicle maintenance conditions. In the exemplary embodiment, the baseline model (and its conditions) may be used to detect an impairment. "Impairment" may be used herein to describe both an operator impairment of the target driver (e.g., second driver) and a vehicle impairment of the target vehicle (e.g., second vehicle, which may include an autonomous or semi-autonomous vehicle).

An operator impairment may include driving behavior that deviates from safe driving practices such as, but not limited to, texting, talking to a passenger, talking on the phone, looking down at a phone, adjusting vehicle settings (e.g., mirror, radio station, vehicle temperature, display clock), eating, drinking, reading billboards, looking away from oncoming traffic, holding items, reaching for items, having one hand on the steering wheel, driving while drowsy, and driving while under the influence of drugs, alcohol, and/or medication causing drowsiness. A vehicle impairment of the target vehicle may include vehicle conditions that deviate from standard vehicle maintenance and place the target vehicle at risk of malfunctioning. Examples of vehicle impairment may range from mechanical problems (e.g., worn brake pads, brake rotors, engine overheating, tire alignment) to basic vehicle maintenance failure, such as replacing brake pads and/or rotating tires. Other examples of vehicle impairment may include faulty operation of semi-autonomous or autonomous features or systems. For instance, electronic components, processors, or sensors may degrade or become inoperable. Also, software versions directing such technology may become degraded, corrupted, obsolete, in need of upgrade, or hacked.

The IA computing device may compare the sensor data to the baseline model and determine whether the sensor data exceeds a first threshold. The IA computing device may categorize the sensor data as low impairment if the sensor data does not exceed the first threshold. For example, the IA computing device may receive sensor data indicating that the target vehicle's front tires are low in pressure. However, the IA computing device may determine that the tire pressures are not within a designated range of potentially causing a collision or other driving hazard. In these embodiments, the IA computing device may have multiple thresholds, and categorize the received sensor data as low, medium, or high impairment.

The IA computing device may output an alert signal to a host vehicle controller based upon detecting that the target driver and/or target vehicle is impaired. As mentioned above, the IA computing device may be configured to output alert signals for certain categories of impairment (e.g., medium and high). Using the example above, the IA computing device may not output an alert signal based upon the determination that the tire pressures are categorized as low impairment. In some embodiments, the host driver may be able to adjust the alert signal settings before driving the host vehicle. In some embodiments, the IA computing device may output an alert signal to a target vehicle controller. In certain embodiments, the IA computing device may also output an alert signal to a vehicle controller of a surrounding vehicle. The IA computing device may output an alert signal by transmitting instructions to an auditory signal generator, a visual signal generator, and/or a haptic signal generator to output a warning alert (e.g., auditory alert, visual alert, and/or haptic alert).

In some embodiments, the IA computing device may include the host vehicle controller. In certain embodiments, the IA computing device and the host vehicle controller may be the same. In some embodiments, the alert signal may escalate in frequency as the possibility of a collision increases. For example, red lights may flash on the instrument panel to warn of a potential collision. In this example, if host driver takes no action as the target vehicle approaches, the steering wheel and driver's seat of the host vehicle may subsequently vibrate, and continuous beeping noises may emit from the audio system. In some embodiments, the host driver may be able to select the type of alert signals the host driver wants, and adjust the settings accordingly before operating the host vehicle.

In further embodiments, the IA computing device may store the sensor data in a memory device, and transmit the sensor data to a remote-computing device to update at least one of an underwriting model and an actuarial model. In these embodiments, the sensor data may be used to adjust an insurance policy of an insurance policy holder (e.g., target driver). In certain embodiments, the sensor data may be used to determine the statistics surrounding impaired drivers and/or impaired vehicles based upon factors such as location (e.g., city, suburb, rural area, urban area), time of day (e.g., morning, midnight), day of week (e.g., weekend, holiday), vehicle types (e.g., sports vehicles, trucks, minivans), and traffic (e.g., rush hour). Modeling data may be extrapolated from the sensor data to evaluate risk associated with impaired drivers and/or impaired vehicles.

Exemplary technical effects of the systems, methods, and computer-readable media described herein may include, for example: (i) providing a real-time alert system that warns a host driver (e.g., first driver) about impaired vehicles and/or impaired drivers of vehicles in the host driver's vicinity; (ii) providing a host driver with an alert and/or multiple alerts that enable the host driver to take preventative action while driving; (iii) transmitting an alert to surrounding vehicles to warn the surrounding vehicles as to a potential collision wherein the surrounding vehicles include a target vehicle (e.g., second vehicle) and other vehicles near the host vehicle and/or the target vehicle; (iv) improving vehicle alert systems by transmitting an alert signal directly to an impaired driver; (v) accurately monitoring the driving behavior and actions of motorists on the road; (vi) improving real-time data collection of motorist driving behavior by capturing continuous data of oncoming and parallel traffic during anytime of the day; (vii) improving mass data acquisition of real-time distracted driving data; (viii) improving the accuracy of insurance models (e.g., underwriting and actuarial models) used to make insurance decisions; and/or (ix) continuously improving the accuracy of data used to make insurance decisions.

Exemplary Host Vehicle

FIG. 1 depicts a view of an exemplary host vehicle (e.g., first vehicle) 100. In some embodiments, host vehicle 100 may be an autonomous or semi-autonomous vehicle capable of fulfilling the transportation capabilities of a traditional automobile or other vehicle. In these embodiments, host vehicle 100 may be capable of sensing its environment and navigating without human input. In other embodiments, host vehicle 100 may be a manual vehicle, such as a traditional automobile that is controlled by a human driver, such as a host driver 106.

Host vehicle 100 may include a plurality of sensors 102, an IA computing device 104, and a host vehicle controller 108. Sensors 102 may include, but are not limited to, radar, LIDAR, Global Positioning System (GPS), video devices, imaging devices, cameras (e.g., 2D and 3D cameras), and audio recorders. The plurality of sensors 102 may detect the current surroundings and location of host vehicle 100. Specifically, sensors 102 may be configured to detect a target vehicle (e.g., second vehicle) 204 (shown in FIG. 2). Target vehicle 204 may be a surrounding vehicle of oncoming and/or parallel traffic.

Sensors 102 may also be configured to detect a target driver (e.g., second driver) (not shown) of target vehicle 204. Conditions of target vehicle 204 detected by the plurality of sensors 102 may include speed, acceleration, gear, braking, cornering, vehicle operation, and other conditions related to the operation of target vehicle, for example: at least one of a measurement of at least one of speed, direction, rate of acceleration, rate of deceleration, location, position, orientation, and rotation of the vehicle, and a measurement of one or more changes to at least one of speed, direction rate of acceleration, rate of deceleration, location, position, orientation, and rotation of the vehicle.

Plurality of sensors 102 may detect the presence of a target driver (e.g., second driver) (not shown) of target vehicle 204. In some embodiments, sensors 102 may detect one or more passengers (not shown) of target vehicle 204. In these embodiments, plurality of sensors 102 may detect the presence of fastened seatbelts, the weight in each seat in the second vehicle, heat signatures, or any other method of detecting information about the target driver and passengers in target vehicle 204.

In certain embodiments, sensors 102 may include occupant position sensors to determine a location and/or position of the target driver and, in some embodiments, passengers in target vehicle. The location of an occupant may identify a particular seat or other location within the target vehicle where the occupant is located. The position of the occupant may include the occupant's body orientation, the location of specific limbs, and/or other positional data. In one example, sensors 102 may include front view and/or side view cameras, LIDAR, radar, weight sensors, accelerometer, gyroscope, compass and/or other types of sensors to identify the location and/or position of occupants within target vehicle 204.

In the exemplary embodiment, an impairment analysis ("IA") computing device 104 may be configured to receive sensor data (e.g., second vehicle data) from sensors 102. IA computing device 104 may interpret the sensor data to determine whether target vehicle 204 and/or the target driver are impaired. In some embodiments, IA computing device 104 may interpret the sensor data to determine whether target vehicle 204 poses a driving hazard to host vehicle 100. In one example, IA computing device 104 may use computer vision methods to detect impairment due to operator impairment of the target driver and/or due to vehicle impairment of target vehicle 204.

IA computing device 104 may interpret the sensor data to determine if the target driver is impaired by analyzing positional data received from sensors 102. Positional data may include a position of the target driver, a gaze direction of the target driver, a direction of facing of the target driver, a size of the target driver, and/or a skeletal positioning of the target driver. The directional facing of the target driver may include whether the target driver is facing forward, reaching forward, reaching to the side, and/or has his/her head turned. The size of the target driver may include the vehicle user's height. The skeletal positioning may include positioning of the target driver's joints, spine, arms, legs, torso, neck face, head, major bones, hands, and/or feet. In some embodiments, positional data may also include a position of a passenger occupying the passenger seat.

Where host vehicle 100 and target vehicle 204 are either semi-autonomous or autonomous vehicles, IA computing device 104 may receive sensor data (e.g., wirelessly communicated) from the target vehicle 204. In these embodiments, IA computing device 104 may interpret the sensor data received from target vehicle 204 to determine if the target vehicle is impaired. Sensor data received from target vehicle 204 may include vehicle telematics data collected by one or more sensors mounted on or installed within target vehicle 204, such as vehicle speed, acceleration, cornering, heading, direction, deceleration, braking, etc. The telematics data may also include a tread depth of one or more vehicle tires, an environmental sensor reading (e.g., temperature, humidity, acceleration), vehicle mileage, vehicle oil and fluid levels, tire pressure, tire temperature, vehicle brake pad thicknesses, gyroscope and accelerometer sensor information, GPS information, and the like.

IA computing device 104 may collect and/or generate telematics data associated with driving characteristics of the target driver. For example, IA computing device 104 may collect telematics data of the target vehicle 204 and/or the target driver from one or more of sensors 102 on host vehicle 100. In some embodiments, IA computing device 104 may also receive telematics data of target vehicle 204 and/or the target driver operating target vehicle 204. For example, target vehicle telematics data collected and analyzed by IA computing device 104 may include, but is not limited to, positional data of the target driver, braking and/or acceleration data, navigation data, vehicle settings (e.g., seat position, mirror position, temperature or air control settings, etc.), and/or any other telematics data associated with target vehicle 204 and/or the target driver.

In the exemplary embodiment, host vehicle controller 108 may be configured to generate an alert signal based upon the determination by IA computing device 104 that the target vehicle 204 and/or the target driver are impaired (e.g., pose a driving hazard to host vehicle 100). Host vehicle controller 108 may generate an auditory signal, a visual signal, and/or a haptic signal to alert host driver (e.g., first driver) 106 of an impaired driver and/or an impaired vehicle. For example, if IA computing device 104 determines that the target vehicle 204 and/or the target driver pose a driving hazard, the steering wheel of host vehicle 100 may vibrate and an alert noise (e.g., beep/chime sound effect) may emanate from the audio system of host vehicle 100.

In some embodiments, host vehicle controller 108 may include a display screen or touchscreen (not shown) that is capable of displaying an alert to host driver 106. In other embodiments, host vehicle controller 108 may be capable of wirelessly communicating with a user computer device 406 (shown in FIG. 4) such as a mobile device (not shown) in host vehicle 100. In these embodiments, host vehicle controller 108 may be capable of communicating with the user of a mobile device, such as host driver 106, through an application on the mobile device. Moreover, where host vehicle 100 and the second vehicle are either autonomous or semi-autonomous vehicles, host vehicle controller 108 may generate and transmit the alert signal to target vehicle 204 to alert the target driver.

In some embodiments, IA computing device 104 may include host vehicle controller 108. In these embodiments, IA computing device 104 may be configured to generate an alert signal (e.g., auditory signal, visual signal, and/or haptic signal) based upon a determination that target vehicle 204 and/or the target driver is impaired. Further, where host vehicle 100 and target vehicle 204 are either autonomous or semi-autonomous vehicles, IA computing device 104 may generate and transmit the alert signal to target vehicle 204 to alert the target driver.

In some embodiments, host vehicle 100 may include autonomous or semi-autonomous vehicle-related functionality or technology that may be used with the present embodiments to replace human driver actions and may include and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality. In these embodiments, the autonomous or semi-autonomous vehicle-related functionality or technology may be controlled, operated, and/or in communication with host vehicle controller 108.

The wireless communication-based autonomous or semi-autonomous vehicle technology or functionality may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous technology or functionality may include and/or be related to: driver alertness or responsive monitoring; pedestrian detection; artificial intelligence and/or backup systems; navigation or GPS-related systems; security and/or anti-hacking measures; and/or theft prevention systems.

While host vehicle 100 may be an automobile in the exemplary embodiment, in other embodiments, host vehicle 100 may be, but is not limited to, other types of ground craft, aircraft, and watercraft vehicles.

Exemplary Alert System

Figure 2:
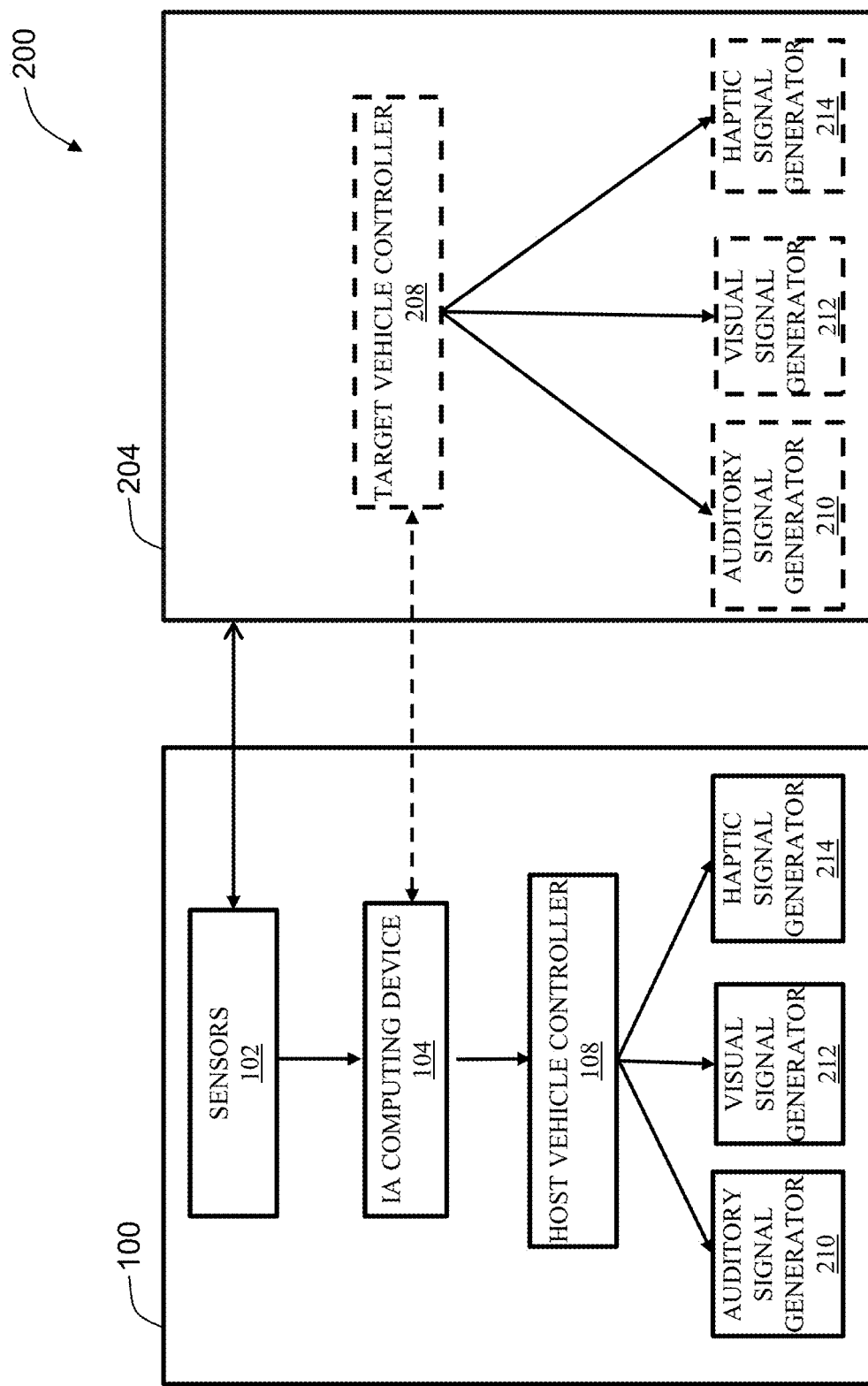
FIG. 2 illustrates a simplified block diagram of an exemplary system including the exemplary host vehicle (shown in FIG. 1) and a target vehicle, in accordance with the present disclosure.

FIG. 2 illustrates a simplified block diagram of an exemplary system 200 including host vehicle 100 as shown in FIG. 1, and target vehicle (e.g., second vehicle) 204. In the exemplary embodiment, host vehicle 100 includes sensors 102, IA computing device 104, and host vehicle controller 108 (all shown in FIG. 1). As explained in FIG. 1, sensors 102 on host vehicle 100 detect the presence of a target driver (e.g., second driver). Sensors 102, such as front view, side view, and/or rear view cameras, detect the position of the target driver to acquire positional data. Positional data may include the driver's body orientation and the location of specific limbs. In the exemplary embodiment, sensors 102 on host vehicle 100 detect the target driver's facial features and body position, such as eye movement, head orientation, neck position, and body posture. In some embodiments, target vehicle 204 may transmit data associated with a target driver and/or target vehicle 204 to sensors 102.

IA computing device 104 receives the sensor data (e.g., second vehicle data) detected by sensors 102, and determines whether target vehicle 204 is impaired (e.g., poses a driving hazard) due to an operator impairment (e.g., target driver impairment). IA computing device 104 may compare the sensor data received from sensors 102 to a baseline model to determine whether the target driver is impaired. The baseline model may be configured to include baseline conditions representing safe driving conditions and standard vehicle maintenance conditions.

The baseline model stored in IA computing device 104 may include baseline conditions for a range of facial features and body positions in accordance with safe driving posture. For example, IA computing device 104 may determine that the target driver is distracted by comparing the target driver's gaze direction and gaze duration to a baseline condition for gaze direction stored in IA computing device 104. IA computing device 104 may determine that the target driver is impaired if the positional data received from sensors 102 falls outside one or more of the baseline conditions, or is otherwise considered abnormal or an outlier from expected conditions or data. For example, if a target driver falls asleep at the wheel, sensors 102 on host vehicle 100 may detect the closed eye position, head angle, and head movement of the target driver. In this example, IA computing device 104 may compare the positional data received from sensors 102 to the baseline model and determine that the target driver is impaired, or is otherwise associated with abnormal driving behavior or activity.

IA computing device 104 may implement computer vision technology and/or other machine learning methods to analyze the sensor data. For instance, deep learning, combined learning, and/or reinforced or reinforcement learning algorithms or techniques may be applied to the sensor data.

In the exemplary embodiment, IA computing device 104 may be in wireless communication with host vehicle controller 108. When IA computing device 104 determines that the target driver is impaired (or otherwise exhibiting abnormal driving behavior), IA computing device 104 may instruct host vehicle controller 108 to generate an alert signal. Host vehicle controller 108 may subsequently instruct at least one of an auditory signal generator 210, a visual signal generator 212, and a haptic signal generator 214 to generate an alert signal.

In some embodiments, the alert signal may escalate in frequency as the potential for a collision increases. For example, red lights may flash on the instrument panel to warn host driver 106 of a potential collision. In this example, if host driver 106 takes no action as target vehicle 204 approaches, the steering wheel and driver's seat may subsequently vibrate, and continuous alarm sounds may emanate from the audio system. In some embodiment, the target vehicle 204 may automatically engage autonomous or semi-autonomous functionality to avoid a vehicle collision, if so equipped.

In alternative embodiments, IA computing device 104 may communicate with a target vehicle controller 208 of target vehicle 204. In these embodiments, host vehicle 100 and target vehicle 204 include autonomous or semi-autonomous vehicle-related functionalities, such as vehicle-to-vehicle (V2V) wireless communication, that enable host vehicle 100 to transmit and receive information. In these embodiments, target vehicle 204 may transmit data as to a target driver and/or target vehicle 204 to sensors 102 of host vehicle 100. When IA computing device 104 determines that the target driver is impaired (or otherwise exhibiting abnormal driving behavior), IA computing device 104 may transmit an alert message to target vehicle 204, and warn of a potential driving hazard (e.g., collision). IA computing device 104 may instruct target vehicle controller 208 to generate an alert signal by prompting at least one of auditory signal generator 210, visual signal generator 212, and haptic signal generator 214 to alert the target driver. In these embodiments, IA computing device 104 transmits alert messages to both host vehicle controller 108 and target vehicle controller 208 such that host driver 106 and the target driver may both take measures to prevent a collision, or that one or both vehicles may automatically engage autonomous or semi-autonomous vehicle functionality to avoid a collision if so equipped.

Exemplary Computer-Implemented Method for Detecting an Impairment

Figure 3:
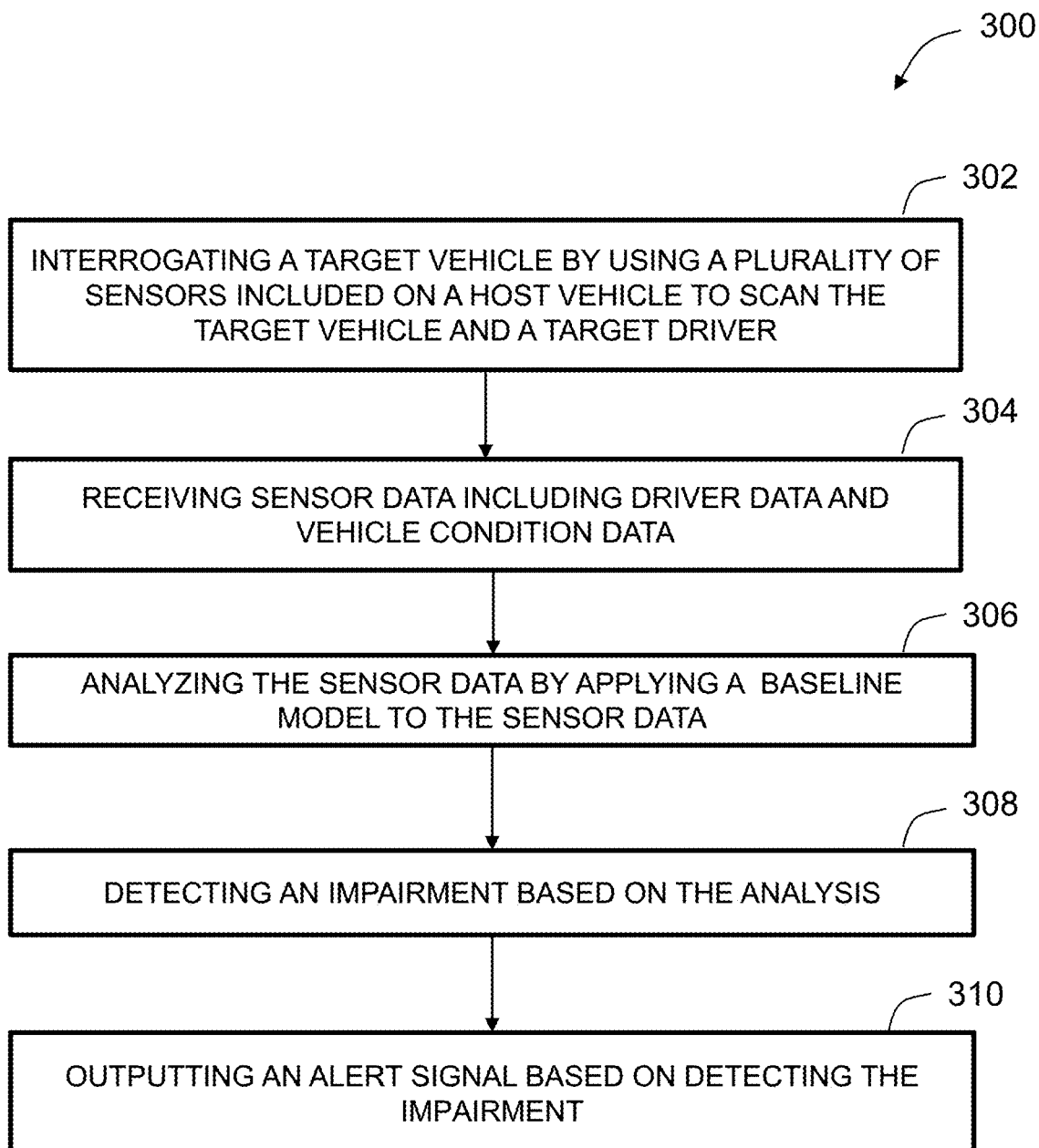
FIG. 3 illustrates a flow chart of an exemplary process for detecting an impairment using the IA computing device shown in FIG. 1, in accordance with the present disclosure.

FIG. 3 illustrates a flow chart of an exemplary computer-implemented process 300 for detecting an impairment. Process 300 may be implemented by a computing device, for example impairment analysis ("IA") computing device 104 (shown in FIG. 1). In the exemplary embodiment, IA computing device 104 may be in communication with a user computer device 406 (shown in FIG. 4), host vehicle controller 108 (shown in FIG. 1), target vehicle controller 208 (shown in FIG. 2), an insurer network 408 (shown in FIG. 4), and sensors 102 (shown in FIG. 1).

In the exemplary embodiment, IA computing device 104 may interrogate 302 a target vehicle 204 (shown in FIG. 2) by using a plurality of sensors 102 (shown in FIG. 1) included on a host vehicle 100 to scan a target vehicle 204 (shown in FIG. 2) and/or a target driver. Examples of sensors 102 on host vehicle 100 may include, but are not limited to, front view, side view, and rear view cameras, video devices, LIDAR, radar, and ultrasound.

Sensors 102 may continuously scan surrounding vehicles and drivers of surrounding vehicles when host vehicle 100 ignition is on. In the exemplary embodiment, sensors 102 detect oncoming and parallel vehicles. Sensors 102 may scan facial features (e.g., eye position, mouth position) and upper body positions (e.g., head orientation and angle, neck position) of a target driver. In some embodiments, sensors 102 may scan additional body positions (e.g., arms, torso) depending on the location of sensors 102 in host vehicle 100. In other embodiments, the plurality of sensors 102 on host vehicle 100 includes a wireless communications device.

In the exemplary embodiment, IA computing device 104 may receive 304 sensor data. Sensor data may include target driver data associated with the target driver, and target vehicle condition data associated with target vehicle 204. Driver data may include positional data of the target driver such as head orientation, body posture, and eye movement. Driver data may also include driving behavior information associated with the target driver, including speed, acceleration, gear, braking, vehicle lane maintenance (e.g., lane drifting), vehicle heading and direction, vehicle operation including vehicle operation with respect to posted speed limits or flow of traffic or environmental conditions, and other conditions related to the operation of target vehicle 204. In some embodiments, IA computing device 104 may receive continuous video data from a plurality of cameras.

Target vehicle condition data may include a tread depth of one or more vehicle tires, an environmental sensor reading (e.g., temperature, humidity, and acceleration), vehicle mileage, vehicle oil and fluid levels, tire pressure, tire temperature, vehicle brake pad thicknesses, gyroscope and accelerometer sensor information. Target vehicle condition data may also include information associated with dashboard indicator lights, engine noise, tire noise, abnormal variation in a dampening of a shock absorber, and the like. Target vehicle condition data may be collected by one or more sensors mounted on or installed within target vehicle 204.

In certain embodiments where host vehicle 100 and target vehicle 204 have autonomous or semi-autonomous vehicle-related functionalities that enable vehicle-to-vehicle (V2V) communication, IA computing device 104 of host vehicle 100 receives the target vehicle condition data from target vehicle 204. In these embodiments, target vehicle 204 may broadcast an alert signal warning surrounding vehicles, such as host vehicle 100 that target vehicle 204 and/or the target driver is impaired. In certain embodiments, the plurality of sensors 102 on host vehicle 100 may include sophisticated sensing mechanisms that detect one or more of the vehicle conditions mentioned above.

In the exemplary embodiment, IA computing device 104 may analyze 306 the sensor data by applying a baseline model to the sensor data. In other embodiments, other models may be applied where these models are generated using machine learning and/or artificial intelligence techniques that are described further herein below. The baseline model may include baseline conditions representing safe driving conditions, safe driving behavior, and/or standard vehicle maintenance conditions.

The baseline conditions may represent a range of facial and body measurements in accordance with safe driving. For example, the baseline model may include a range of head motions for an average adult of varying heights. The range of head motions may encompass measurements for horizontal head rotation (e.g., right to left rotation of the head) and movements of the neck (e.g., forward to backward movement, right to left movement) associated with safe driving behavior.

The baseline model may also include baseline conditions for lane position, speed, and vehicle dynamics. In some embodiments, the baseline conditions for a vehicle or for vehicle operation may be dynamic and change based upon location and driving conditions, including environmental, traffic density, and/or construction. For instance, GPS location may be used to determine a posted speed limit and a direction of traffic. The plurality of sensors 102 on host vehicle 100 may be used to determine weather conditions, such as heavy rain, light rain, ice, snow, or sleet, or absence thereof. The plurality of sensors 102 may also be used to determine traffic density, flow of traffic, speed of traffic, etc. The baseline conditions may include parameters as to normal direction of traffic flow, and normal traffic stoppage, such as at a traffic light or stop sign.

During the analysis process, IA computing device 104 compares the sensor data to the baseline conditions of the baseline model to determine whether the target driver and/or target vehicle 204 is impaired, or otherwise exhibiting abnormal vehicle operation. In some embodiments, IA computing device 104 compares the sensor data to one or more baseline conditions. The baseline conditions may include parameters associated with safe driving and standard vehicle maintenance. IA computing device 104 may continuously apply baseline conditions of the baseline model in real time as the IA computing device 104 receives 304 the sensor data. In certain embodiments, comparing the sensor data to the baseline model may reveal one or more outliers (e.g., abnormalities, deviations) from expected conditions (e.g., the baseline conditions). In other embodiments, IA computing device 104 selects the baseline conditions to use based upon the type of sensor data the IA computing device 104 receives. For example, IA computing device 104 may use baseline conditions for eye movement and head position to compare positional data received from sensors 102. Additionally or alternatively, IA computing device 104 may use baseline conditions for vehicle dynamics to compare steering input information received from sensors 102. Such data may indicate swerving or vehicle operation outside of a designated lane. In some embodiments, the baseline model may include data from the National Transportation Safety Board or the National Highway Traffic Safety Administration.

In further embodiments, the baseline conditions may include thresholds such as a first threshold and a second threshold for assessing the sensor data. The thresholds may be predetermined thresholds stored in database 404 (see FIG. 4). One or more thresholds may be used to categorize the sensor data received (such as data on vehicle speed variation and/or vehicle lane departure) as low (or no) impairment, medium impairment, or high impairment. For example, IA computing device 104 may determine target vehicle 204 is traveling at an inconsistent speed (e.g., accelerating or decelerating in a relatively short period of time). The sensor data may indicate that target vehicle 204 accelerated 15 miles per hour (mph) in a short amount of time. However, IA computing device 104 may determine that the acceleration is not an impairment (e.g., not a risk to host vehicle 100) because prior to accelerating, target vehicle 204 was at a red traffic light. In this example, although the 15 mph acceleration may exceed a first threshold applied by IA computing device 104, IA computing device may determine that, given the circumstances, the acceleration is not enough to exceed a second threshold because target vehicle 204 is traveling at relatively the same speed as nearby vehicles.

In another example, IA computing device 104 may apply a first threshold and determine that target vehicle 204 is drifting from its associated lane. In this example, target vehicle 204 may be traveling in the left lane alongside host vehicle 100. IA computing device 104 may apply a second threshold to determine if the lane deviation (e.g., lane departure) of target vehicle 204 presents a risk (e.g., impairment) to host vehicle 100. For instance, if the target vehicle 204 immediately realigns itself along the center of its lane (e.g., target vehicle 204 has an automatic or semi-automatic lane-keeping assist system), IA computing device 104 may determine that the detected lane departure of target vehicle 204 presents no or low impairment to host vehicle 100.

However, if target vehicle 204 continues to drift outside of its associated lane markings, IA computing device 104 may determine that the detected lane departure of target vehicle 204 presents an impairment. IA computing device 104 may categorize the impairment as medium or high impairment depending on factors such as the time period and/or extent of the lane departure (e.g., swerving in and out of lane multiple times).

In the exemplary embodiment, IA computing device 104 may detect 308 an impairment based upon the analysis. The impairment may be an operator impairment associated with the target driver and/or a vehicle impairment of target vehicle 204. For example, based upon the sensor data, IA computing device 104 may detect that the target driver is distracted and that one of the tires of target vehicle 204 is flat.

In some embodiments, IA computing device 104 may compare the sensor data to the baseline model and determine whether the sensor data meets, or exceeds, one or more baseline conditions. For example, IA computing device 104 may determine that target vehicle 204 is impaired by detecting that target vehicle 204 is traveling at a speed outside a range set by the baseline condition, which may be associated with a posted speed limit for a given GPS location or road. In other embodiments, IA computing device 104 may compare the sensor data to the baseline model and determine whether the sensor data exceeds a first threshold.

IA computing device 104 may categorize the sensor data as low impairment if the sensor data does not exceed the first threshold. In these embodiments, IA computing device 104 may determine if the sensor data exceeds multiple thresholds (e.g., second threshold, third threshold), and categorize the sensor data accordingly as low, medium, or high impairment. For example, if a target driver is actively talking to a passenger, IA computing device 104 may analyze the target driver's eye or mouth movement and head position, and categorize the sensor data as high impairment. However, if the target driver is talking to a passenger while waiting at a red light, IA computing device 104 may categorize the sensor data as low impairment.

In the exemplary embodiment, IA computing device 104 may output 310 an alert signal based upon the determination that target vehicle 204 is impaired. In some embodiments, IA computing device 104 may determine that target vehicle 204 is impaired if IA computing device 104 detects an impairment that is categorized as a medium or high impairment. In these embodiments, IA computing device 104 may not output an alert signal for impairments categorized as low impairments. In other embodiments, IA computing device 104 may determine that target vehicle 204 is impaired if the sensor data meets or falls outside the baseline conditions of the baseline model.

In the exemplary embodiment, IA computing device 104 outputs the alert signal to target vehicle 204. The alert signal is at least one of an auditory signal, a visual signal and a haptic signal. In some embodiments, IA computing device 104 may output multiple alert signals depending on a category of impairment (e.g., high impairment). For example, if target vehicle 204 speeds through a red light and heads directly towards host vehicle 100, IA computing device 104 may simultaneously output an auditory, visual, and haptic signal to alert host driver 106 (shown in FIG. 1).

In some embodiments, IA computing device 104 may include host vehicle controller 108 (shown in FIG. 2). In other embodiments, IA computing device 104 may separately instruct host vehicle controller 108 to prompt at least one of auditory signal generator 210, visual signal generator 212, and haptic signal generator 214 to output an alert signal.

Additionally or alternatively, in embodiments where host vehicle 100 has autonomous or semi-autonomous vehicle related functionalities, IA computing device 104 may engage in other corrective action (e.g., collision avoidance action) based upon detecting that target driver and/or target vehicle 204 is impaired. In some embodiments, IA computing device 104 may generate a recommendation or a control signal at host vehicle 100 to engage an automatic safety system (e.g., autonomous vehicle control system) of host vehicle 100, such as an automatic braking system (e.g., automatic emergency braking), acceleration system, and/or steering system, if so equipped. In other embodiments, IA computing device 104 may generate a recommendation or a control signal at host vehicle 100 to engage a semi-automatic safety system (e.g., semi-autonomous vehicle control system) of host vehicle 100, such as a semi-automatic braking system, acceleration system, and/or steering system.

In certain embodiments where host vehicle 100 has a variety of automated (e.g., semi-automatic, automatic) safety systems, IA computing device 104 may recommend engaging (or cause to be engaged) one or more automated safety systems that are best suited to prevent a collision with target vehicle 204 (e.g., reduce a probability of colliding with target vehicle 204) given the circumstances surrounding the detected impairment. For example, if IA computing device 104 detects an impairment due to target vehicle 204 speeding through a red light as host vehicle 100 makes a left turn, IA computing device 104 may recommend engaging (or cause to be engaged) an automated steering or braking system (e.g., automatic emergency braking system) of host vehicle 100 rather than engaging a blind spot warning system. In further embodiments, IA computing device 104 may instruct host vehicle controller 108 to automatically steer host vehicle 100 away from an oncoming path of target vehicle 204. In these embodiments, host vehicle controller 108 may subsequently instruct a vehicle control system such as a vehicle steering system to maneuver host vehicle 100 away from target vehicle 204.

IA computing device 104 may convey the recommendation to host driver 106 via auditory signal generator 210 and/or visual signal generator 212. In these embodiments, IA computing device 104 may take corrective action based upon feedback from host driver 106 in regards to the recommendation. For example, IA computing device 104 may recommend engaging an automated braking system of host vehicle 100. The recommendation may be audibly conveyed to host driver 106 via auditory signal generator 210, and may require a response input from host driver 106 to engage the automated braking system. In further embodiments where host vehicle 100 has autonomous vehicle related functionalities, IA computing device 104 may automatically engage an automated (e.g., automatic or semi-automatic) safety system such as an automatic braking system, acceleration system, and/or steering system, if so equipped. In these embodiments, IA computing device 104 may engage an automated safety system of host vehicle 100 without requiring any input from host driver 106.

In further embodiments where host vehicle 100 and target vehicle 204 have autonomous or semi-autonomous vehicle related functionalities that enable vehicle-to-vehicle (V2V) communication, IA computing device 104 may output the alert signal to target vehicle 204 (as shown in FIG. 2). More specifically, IA computing device 104 may transmit an alert message to target vehicle controller 208 (as shown in FIG. 2), and target vehicle controller 208 may prompt at least one of auditory signal generator 210, visual signal generator 212, and/or haptic signal generator 214 of target vehicle 204 to output an alert signal. In certain embodiments, transmitting an alert message to target vehicle controller 208 may result in target vehicle controller 208 taking control of target vehicle 204 to prevent a driving hazard (e.g., actively steer target vehicle 204 and prevent target vehicle 204 from leaving its lane, or automatically engaging other autonomous or semi-autonomous vehicle technologies).

In some further embodiments, IA computing device 104 may store the baseline model, including the baseline conditions, in at least one memory device. In other embodiments, IA computing device 104 may store the sensor data in at least one memory device. In these embodiments, IA computing device may transmit the sensor data to a remote-computing device to update at least one of an underwriting model and an actuarial model. The sensor data may be used to adjust an insurance policy of an insurance holder, such as providing an increased discount for having a vehicle equipped with the collision avoidance functionality discussed herein.

Exemplary Computer Network

Figure 4:
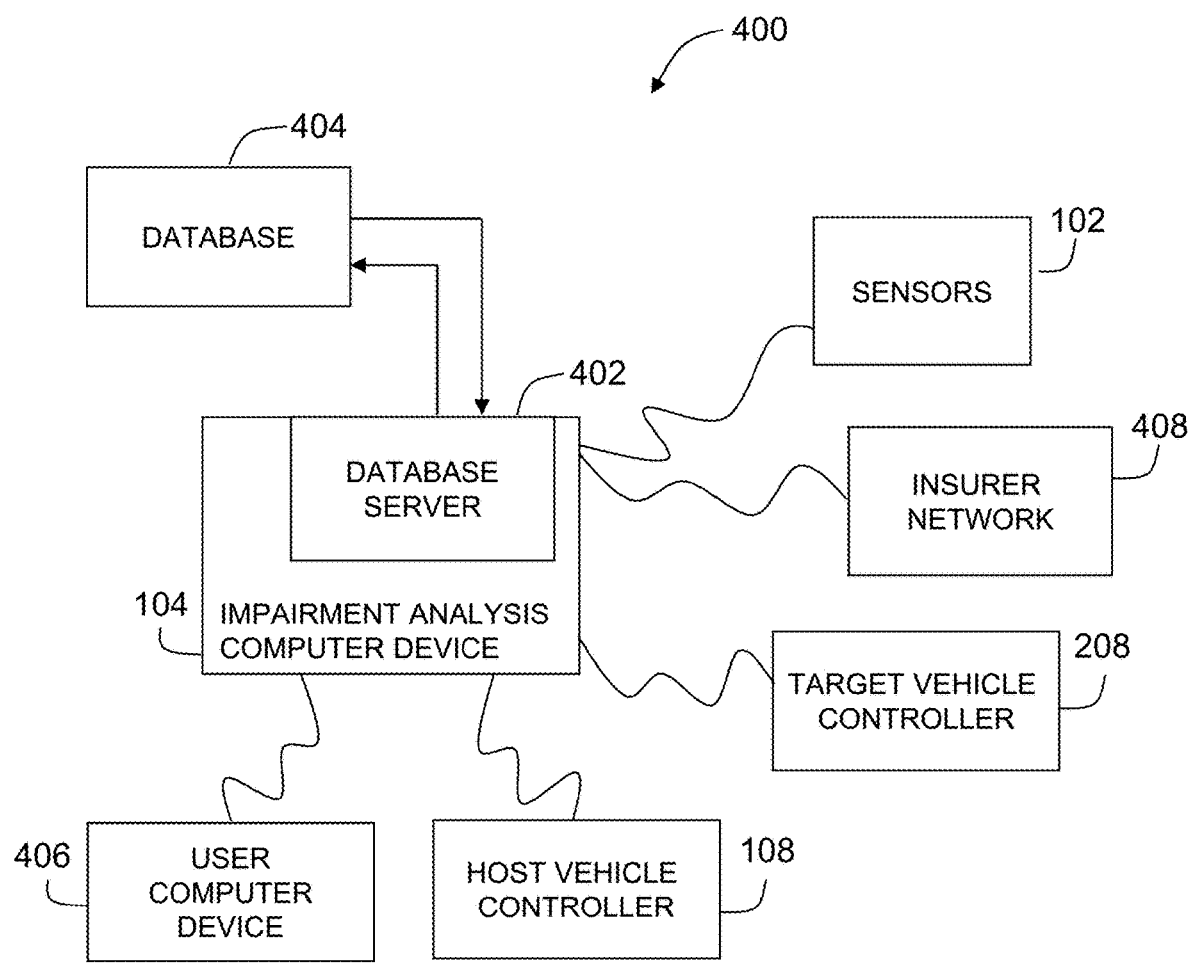
FIG. 4 illustrates a simplified block diagram of an exemplary impairment analysis computer system for implementing the process shown in FIG. 3 and FIG. 7, in accordance with the present disclosure.
Figure 7A:
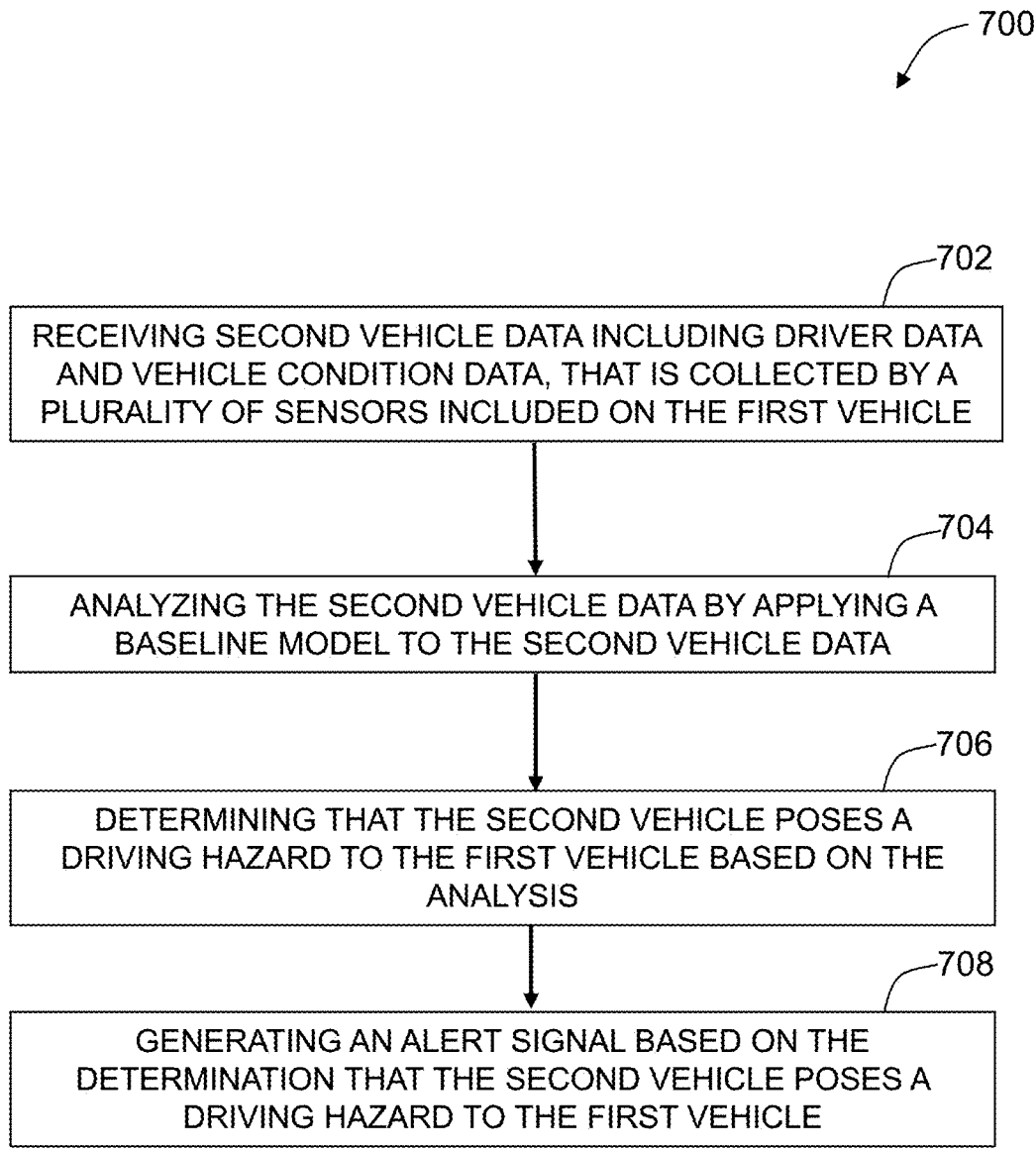
FIG. 7A illustrates a flow chart of an exemplary process of determining whether a second vehicle, such as the target vehicle shown in FIG. 2, poses a driving hazard to a first vehicle, such as the host vehicle shown in FIG. 1, in accordance with one embodiment of the present disclosure.

FIG. 4 depicts a simplified block diagram of an exemplary computer system 400 for implementing process 300 shown in FIG. 3 and process 700 shown in FIG. 7A. In the exemplary embodiment, computer system 400 may be used to determine that target vehicle 204 is impaired (e.g., poses a driving hazard) or otherwise operating abnormally or erratically due to an operator impairment and/or a vehicle impairment. As described below in more detail, impairment analysis ("IA") computing device 104, which is implemented locally on host vehicle 100 (shown in FIG. 1) may be configured to (i) interrogate target vehicle 204 (shown in FIG. 2) by using a plurality of sensors included on host vehicle 100 to scan target vehicle 204 and a target driver; (ii) receive sensor data including target driver data and/or target vehicle condition data; (iii) analyze the sensor data by applying a baseline model to the sensor data; (iv) detect an impairment based upon the analysis; and/or (v) output an alert signal based upon detecting that target vehicle 204 (shown in FIG. 2) is impaired (e.g., poses a driving hazard), or direct other collision avoidance actions.

In the exemplary embodiment, IA computing device 104 is in communication with sensors 102 (as shown in FIG. 1). Sensors 102 may be positioned on host vehicle 100 (shown in FIG. 2), and include at least one of radar, LIDAR, Global Positioning System (GPS), video recording devices, imaging devices, cameras, and audio records. Sensors 102 may be any device capable of scanning the head, face (including eyes), and body of the target driver. Sensors 102 may also be any device capable of detecting movements of target vehicle 204 including at least one of steering wheel angle, speed, acceleration, lane deviation, and road condition. In some embodiments, sensors 102 include a wireless communication device. In these embodiments, sensor data may be received at the wireless communication device as an alert message from target vehicle 204.

In the exemplary embodiment, user computer devices 406 may be computers that include a web browser or a software application, which enables user computer devices 406 to access remote computer devices, such as IA computing device 104 and insurer network 408 computer devices, using the Internet or other network. More specifically, user computer devices 406 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 406 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

In the exemplary embodiment, a database server 402 may be communicatively coupled to a database 404 that stores data. Database 404 may be located on host vehicle 100 or may be located remotely from host vehicle 100. In one embodiment, database 404 may include the sensor data (e.g., second vehicle data) received from sensors 102, the baseline model including the baseline conditions, and the processed sensor data to which the baseline model has been applied. In the exemplary embodiment, database 404 may be stored remotely from IA computing device 104. In some embodiments, database 404 may be decentralized. In other embodiments, a user, such as host driver 106 (shown in FIG. 1), may access database 404 via a user computer device 406 by logging into IA computing device 104.

IA computing device 104 may also be communicatively coupled with host vehicle controller 108 (as shown in FIG. 1). In some embodiments, IA computing device 104 may include host vehicle controller 108. Additionally or alternatively, IA computing device may be communicatively coupled with target vehicle controller 208 (as shown in FIG. 2). In these embodiments, host vehicle 100 and target vehicle 204 (both shown in FIG. 2) have autonomous or semi-autonomous vehicle-related functionalities enabling vehicle-to-vehicle (V2V) communication. IA computing device 104 may be communicatively coupled with one or more user computing devices 406.

In some embodiments, IA computing device 104 may be associated with, or is part of a computer network associated with an insurance provider, or in communication with the insurance network 408 computer devices. In other embodiments, IA computing device 104 may be associated with a third party and is merely in communication with the insurance network 408 computer devices. More specifically, IA computing device 104 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

Insurer network 408 computer devices may include one or more computer devices associated with an insurance provider. In some embodiments, an insurance provider may be associated with a user, such as host driver 106 (shown in FIG. 1) and/or a target driver who has an auto insurance policy with insurance provider. In these embodiments, insurer network 408 computer devices may include a web browser or a software application, which enables insurer network 408 computer devices to access remote computer devices, such as IA computing device 104 and database server 402, using the Internet or other network. More specifically, insurer network 408 computer devices may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

User computer devices 406 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, insurer network 408 computer devices may access database 404 to update an underwriting model and/or an actuarial model. In other embodiments, insurer network 408 computer devices may access database 404 to adjust an insurance policy of an insurance holder (e.g., target driver). Moreover, insurer network 408 computer devices may specifically access database 404 to collect real-time data on impaired drivers and/or impaired vehicles.

In some embodiments, IA computing device 104 may transmit the sensor data to a remote-computing device such as insurer network 408 computer devices. The transmitted sensor data may be used to update and/or create an underwriting model and/or an actuarial model to determine the likelihood of vehicle collisions on roads due to impaired drivers and/or impaired vehicles. In other embodiments, the sensor data may be used to adjust an insurance policy of an insurance policy holder. For example, following a vehicle collision, the sensor data may be transmitted to a target driver's insurer network 408 computer device, and used to prepare a proposed insurance claim for an insured's review and/or ultimately adjust the target driver's insurance policy.

Insurer network 408 computer devices may retrieve, from IA computing device 104, sensor data such as (but not limited to) the weather conditions, the information on the roads and road conditions, the speed limits on those roads, estimated traffic patterns on those roads during various dates and times, such as weekend/weekday/holiday traffic patterns, the make, model, and year of target vehicle 204, and/or safety features of target vehicle 204. Insurer network 408 computer devices may also retrieve sensor data that includes information on surrounding accidents and/or traffic conditions on the roads. The road information mentioned above and elsewhere herein may be retrieved in some embodiments based upon current GPS location of either the host or target vehicle being used to identify the relevant road or roads that the host or target vehicles are traveling. In some embodiments, IA computing device 104 may transmit sensor data that enables insurer network 408 computer devices to determine the safety record of target vehicle 204.

This data may subsequently be analyzed by insurer network 408 computer devices using modeling techniques such as artificial intelligence, character recognition (e.g., through use of computer vision), or machine learning. These modeling techniques may be used to determine which circumstances are most indicative of high-risk impaired driving. These determinations may subsequently be used to review and adjust automobile insurance premiums of drivers. For example, drivers who have long commutes everyday on congested roads may have higher insurance premiums than those who drive short distances a several times a week with lighter traffic density.

In some embodiments, the transmitted sensor data may include data received by IA computing device 104 from an autonomous or semi-autonomous vehicle. The types of autonomous or semi-autonomous vehicle-related functionality or technology that may be used with the present embodiments include and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering, acceleration, braking, collision warning, and/ or blind spot monitoring; (f) adaptive cruise control; (g) automatic or semi-automatic parking/parking assistance and/or collision preparation (windows roll up, seat adjusts upright, brakes pre-charge, etc.); (h) driver acuity/alertness monitoring; (i) pedestrian detection; (j) autonomous or semi- autonomous backup systems; (k) road mapping or navigation systems; (l) software security and anti-hacking measures; (m) theft prevention/automatic return; (n) automatic or semi-automatic driving without occupants; and/or other functionality.

The data received by IA computing device 104 from autonomous or semi-autonomous vehicles may include further indicators representative of high-risk impaired driving in addition to those received from entirely manually-operated vehicles. For example, the data may include detailed information collected by target vehicle 204 as to a target driver and the vehicle condition of target vehicle 204. For example, based upon the type of autonomous or semi-autonomous vehicle-related technology of target vehicle 204, the data may include driving history (e.g., number of accidents and/or near accidents at a specific time, date, and/or geographical location) and/or driving pattern of a target driver. Insurer network 408 computer devices may retrieve this data from IA computing device 104. This data may subsequently be analyzed by insurer network 408 computer devices using modeling techniques, such as artificial intelligence and/or machine learning. These modeling techniques may be used to determine which circumstances are most indicative of high-risk impaired driving to review and adjust automobile insurance premiums of drivers.

The adjustments to automobile insurance rates or premiums based upon the autonomous or semi-autonomous vehicle-related functionality or technology may take into account the impact of such functionality or technology on the likelihood of a vehicle accident or collision occurring. For instance, a processor may analyze historical accident information and/or test data involving vehicles having autonomous or semi-autonomous functionality. Factors that may be analyzed and/or accounted for that are related to insurance risk, accident information, or test data may include (a) point of impact; (b) type of road; (c) time of day; (d) weather conditions; (e) road construction; (f) type/length of trip; (g) vehicle style; (h) level of pedestrian traffic; (i) level of vehicle congestion; (j) atypical situations (such as manual traffic signaling); (k) availability of internet connection for the vehicle; and/or other factors. These types of factors may also be weighted according to historical accident information, predicted accidents, vehicle trends, test data, and/or other considerations.

Insurance network 408 computer devices may use machine learning and/or artificial intelligence techniques to develop impaired driving models that can be used for adjusting and/or calculating automobile insurance premiums based upon risks associated with certain driving situations. In some embodiments, insurance network 408 computer devices may create or update one or more impaired driving models based upon the sensor data received from the plurality of sensors 102 on host vehicle 100. Sensor data generally may include target driver data and target vehicle condition data, such as (but not limited to), sudden acceleration/deceleration, average speed, and average stopping distance, as well as times of the day/week target vehicle 204 is driven, the model and make of target vehicle 204, distance driven, and/or location information.

IA computing device 104, host vehicle controller 108, and/or user computer device 406 may employ machine learning functionality to develop and maintain impaired driving models that characterize the driving of impaired drivers and the vehicle condition of impaired vehicles based upon sensor data including target driver data and target vehicle condition data, such that IA computing device 104 may continually update the impaired driver models. For example, a target driver may exhibit one or more high-risk behaviors, according to collected vehicle telematics data (e.g., high occurrence of abrupt deceleration, particularly fast turns, and/or extreme acceleration).

The impaired driving models may include one or more characteristics that represent various risk behaviors exhibited (or not exhibited) by a target driver and/or target vehicle 204. For instance, one characteristic may include a numeric value or other indicator that represents that a target driver rarely drives above a posted speed limit. As another example, another characteristic may include a numeric value or other indicator that represents that a target driver frequently drives at "high-risk" times of the day, such as between midnight and 6 AM. As another example, a characteristic may be associated with maintenance of target vehicle 204, such as whether or not scheduled maintenance is performed in a timely manner.

IA computing device 104 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In still further embodiments, IA computing device 104 may be separate from host vehicle controller 108 (as shown in FIG. 1) and merely be in communication with host vehicle controller 108 to transmit instructions for generating an alert signal, or directing other collision avoidance actions.

Exemplary Client Device

Figure 5:
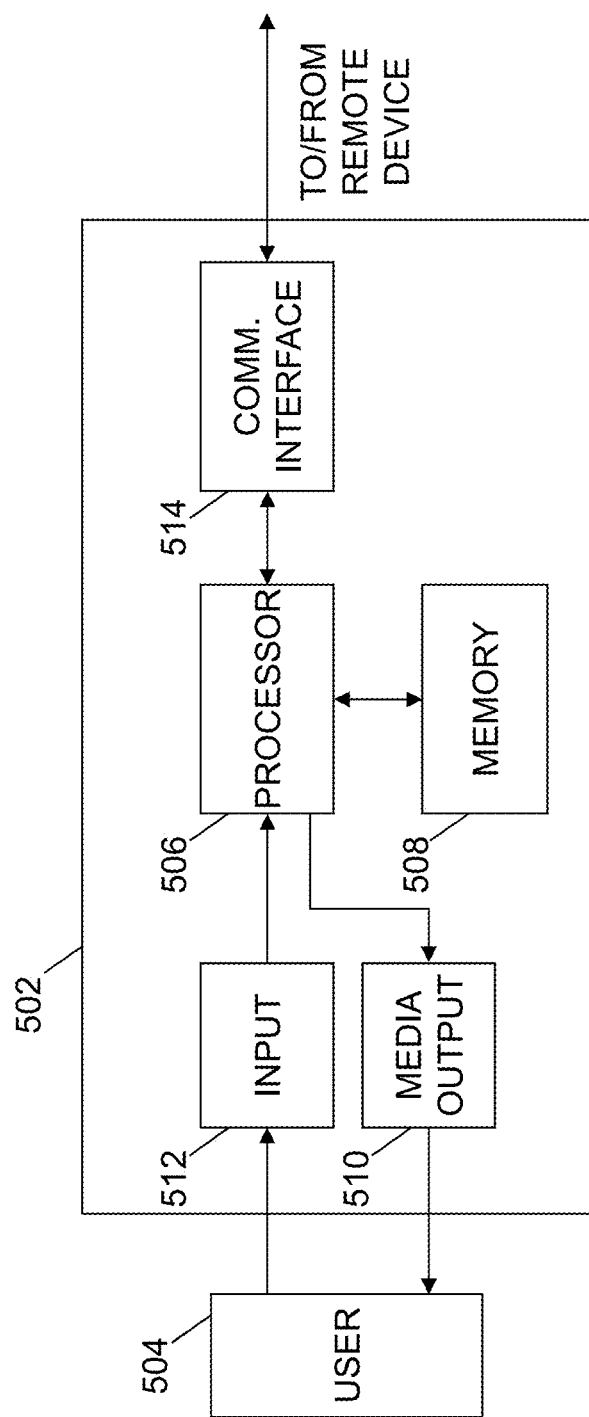
FIG. 5 illustrates an exemplary configuration of a user computer device, in accordance with one embodiment of the present disclosure.

FIG. 5 depicts an exemplary configuration of user computer device 406 shown in FIG. 4, in accordance with one embodiment of the present disclosure. User computer device 502 may be operated by a user 504. User computer device 502 may include, but is not limited to, user computer devices 406, IA computing device 104, host vehicle controller 108, and target vehicle controller 208 (all shown in FIG. 4).

User computer device 502 may include a processor 506 for executing instructions. In some embodiments, executable instructions may be stored in a memory area 508. Processor 506 may include one or more processing units (e.g., in a multi-core configuration). Memory area 508 may be any device allowing information such as executable instructions and/or transaction data to be stored and retrieved. Memory area 508 may include one or more computer readable media.

User computer device 502 may also include at least one media output component 510 for presenting information to user 504. Media output component 510 may be any component capable of conveying information, such as an alert signal to user 504. In some embodiments, media output component 510 may include an output adapter (not shown) such as a video adapter and/or an audio adapter. An output adapter may be operatively coupled to processor 506 and operatively coupleable to an output device, such as a display device (e.g., a cathode ray tube (CRT), liquid crystal display (LCD), light emitting diode (LED) display, or "electronic ink" display) or an audio output device (e.g., a speaker or headphones).

In some embodiments, media output component 510 may be configured to present a graphical user interface (e.g., a web browser and/or a client application) to user 504. A graphical user interface may include, for example, an interface for viewing visual alerts. In some embodiments, user computer device 502 may include an input device 512 for receiving input from user 504. User 504 may use input device 512 to, without limitation, preset alert signal settings on host vehicle 100 and/or acknowledge a visual alert/message.

Input device 512 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 510 and input device 512.

User computer device 502 may also include a communication interface 514, communicatively coupled to a remote device such as IA computing device 104 (shown in FIG. 1). Communication interface 514 may include, for example, a wired or wireless network adapter and/or a wireless data transceiver for use with a mobile telecommunications network.

Stored in memory area 508 are, for example, computer readable instructions for providing a user interface to user 504 via media output component 510 and, optionally, receiving and processing input from input device 512. A user interface may include, among other possibilities, a web browser and/or a client application. Web browsers enable users, such as user 504, to display and interact with media and other information typically embedded on a web page or a website from IA computing device 104.

A client application may allow user 504 to interact with, for example, IA computing device 104. For example, instructions may be stored by a cloud service, and the output of the execution of the instructions sent to the media output component 510.

Exemplary Server Device

Figure 6:
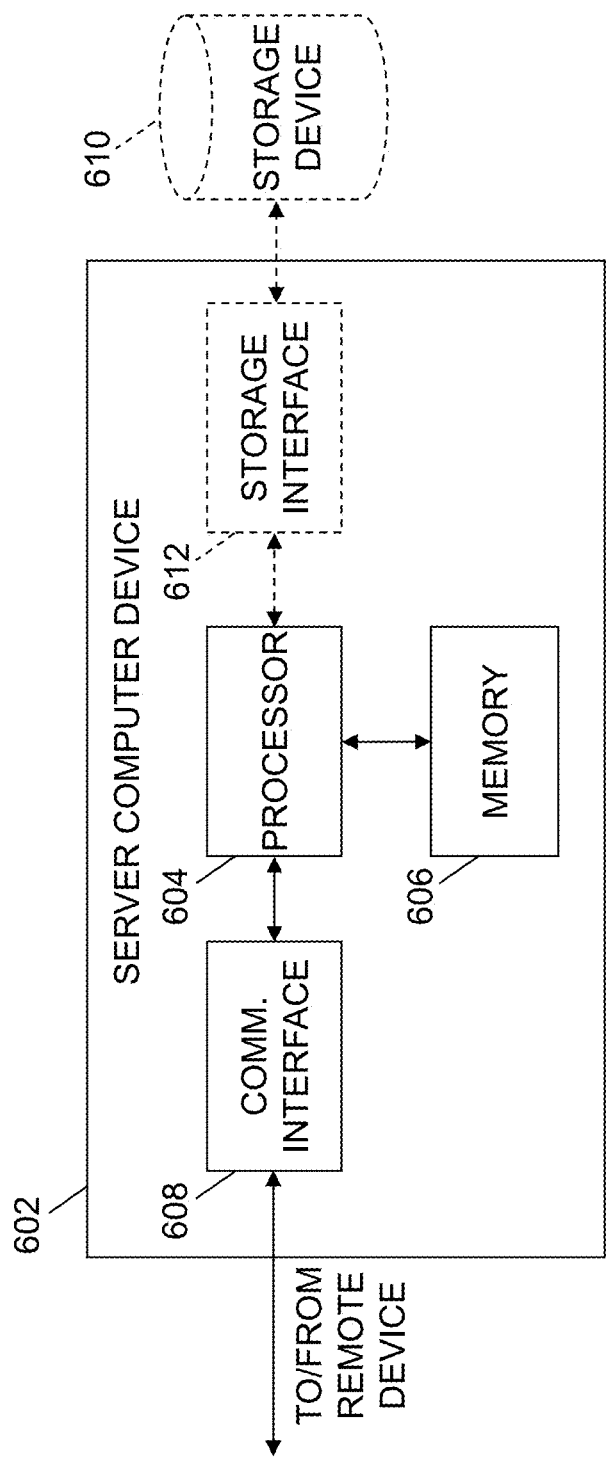
FIG. 6 illustrates an exemplary configuration of a server computer device, in accordance with one embodiment of the present disclosure.

FIG. 6 depicts an exemplary configuration 600 of a server computer device 602, in accordance with one embodiment of the present disclosure. In the exemplary embodiment, server computer device 602 may be similar to, or the same as, IA computing device 104 (shown in FIG. 1). Server computing device 602 may include, but is not limited to, IA computing device 104, insurer network 408 computer devices, and database server 402 (all shown in FIG. 4). Server computer device 602 may also include a processor 604 for executing instructions. Instructions may be stored in a memory area 606. Processor 604 may include one or more processing units (e.g., in a multi-core configuration).

Processor 604 may be operatively coupled to a communication interface 608 such that server computer device 602 is capable of communicating with a remote device such as another server computer device 602, IA computing device 104, host vehicle controller 108, target vehicle controller 208, and user computer devices 406 (all shown in FIG. 4) (for example, using wireless communication or data transmission over one or more radio links or digital communication channels). For example, communication interface 608 may receive requests from user computer devices 406 via the Internet or other network, as illustrated in FIG. 4.

Processor 604 may also be operatively coupled to a storage device 610. Storage device 610 may be any computer-operated hardware suitable for storing and/or retrieving data, such as, but not limited to, data associated with database 404 (shown in FIG. 4). In some embodiments, storage device 610 may be integrated in server computer device 602. For example, server computer device 602 may include one or more hard disk drives as storage device 610.

In other embodiments, storage device 610 may be external to server computer device 602 and may be accessed by a plurality of server computer devices 602. For example, storage device 610 may include a storage area network (SAN), a network attached storage (NAS) system, and/or multiple storage units such as hard disks and/or solid state disks in a redundant array of inexpensive disks (RAID) configuration.

In some embodiments, processor 604 may be operatively coupled to storage device 610 via a storage interface 612. Storage interface 612 may be any component capable of providing processor 604 with access to storage device 610. Storage interface 612 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 604 with access to storage device 610.

Processor 604 may execute computer-executable instructions for implementing aspects of the disclosure. In some embodiments, the processor 604 may be transformed into a special purpose microprocessor by executing computer-executable instructions or by otherwise being programmed. For example, the processor 604 may be programmed with the instruction such as illustrated in FIG. 3.

A client application may allow user 504 to interact with, for example, IA computing device 104. For example, instructions may be stored by a cloud service, and the output of the execution of the instructions sent to the media output component 510.

Exemplary Computer-Implemented Method for Alerting a Host Driver to a Driving Hazard FIG. 7A illustrates a flow chart of an exemplary computer-implemented process 700 for one aspect of determining whether target vehicle 204 poses a driving hazard to host vehicle 100 (e.g., is impaired) using system 400 (shown in FIG. 4). Process 700 may be implemented by a computing device, for example impairment analysis ("IA") computing device 104 (shown in FIG. 1). In the exemplary embodiment, IA computing device 104 may be in communication with a user computer device 406 (shown in FIG. 4), host vehicle controller 108, target vehicle controller 208, an insurer network 408, and sensors 102 (all shown in FIG. 4).

In the exemplary embodiment, IA computing device 104 may receive 702 second vehicle data (e.g., sensor data) including second driver data (e.g., target driver data) and second vehicle condition data (e.g., target vehicle condition data) of a second vehicle (e.g., target vehicle 204), that is collected by a plurality of sensors 102 included on a first vehicle (e.g., host vehicle 100). Sensors 102 such as front view, side view, and rear view cameras, LIDAR, radar, and ultrasound may continuously scan vehicles of oncoming and parallel traffic when the first vehicle's ignition is on.

Sensors 102 may scan the facial features (e.g., eye movement) and body postures (e.g., head orientation, neck position) of a second driver (e.g., target driver) to capture second driver data and second vehicle condition data. The plurality of sensors 102 on the first vehicle may include a wireless communications device. Second driver data may include positional data of the second driver such as head orientation, body posture and orientation, head or mouth movement, arm movement, and eye movement. Second driver data may also include driving behavior information associated with the second driver, including speed, acceleration, gear braking, vehicle orientation and direction, and vehicle lane maintenance (e.g., lane drifting), and other conditions related to the operation of the second vehicle (e.g., target vehicle 204). In some embodiments, IA computing device 104 may receive video data from a plurality of cameras.

Second vehicle condition data may include a tread depth of one or more vehicle tires, an environmental sensor reading (e.g., temperature, humidity, and acceleration), vehicle mileage, vehicle oil and fluid levels, tire pressure, tire temperature, vehicle brake pad thicknesses, gyroscope and accelerometer sensor information. Second vehicle condition data may also include information associated with vehicle maintenance, engine noise, tire noise, abnormal variation in a dampening of a shock absorber, and the like. Second vehicle condition data may be collected by one or more sensors mounted on or installed within the second vehicle. Second vehicle condition data may include operation data associated with the operation or operability of one or more safety features, including one or more autonomous or semi-vehicle systems or technologies, and associated maintenance records. In certain embodiments where first vehicle 100 and second vehicle 204 have autonomous or semi-autonomous vehicle-related functionalities that enable vehicle-to-vehicle (V2V) communication, IA computing device 104 of the first vehicle receives the second vehicle condition data from the second vehicle. In other embodiments, the plurality of sensors 102 on the first vehicle may include sophisticated sensing mechanisms that detect one or more of the vehicle conditions mentioned above.

IA computing device 104 may analyze 704 the second vehicle data by applying a baseline model to the second vehicle data. The baseline conditions may represent a range of facial and body measurements in accordance with safe driving. For example, the baseline model may include a range of head motions for an average adult of varying heights. The range of head motions may encompass measurements for horizontal head rotation (e.g., right to left rotation of the head) and movements of the neck (e.g., forward to backward movement, right to left movement) associated with standard driving posture. The baseline model may also include baseline conditions for lane position, speed, and vehicle dynamics.

During the analysis process, IA computing device 104 may compare the second vehicle data to the baseline conditions of the baseline model to determine whether the second driver and/or the second vehicle pose a driving hazard to the first vehicle. For instance, the second vehicle data may reveal one or more outliers from the baseline model or abnormal conditions. In some embodiments, IA computing device 104 compares the second vehicle data to one or more baseline conditions.

In some embodiments, IA computing device 104 selects the baseline conditions to use based upon the type of second vehicle data the IA computing device 104 receives. For example, IA computing device 104 may use baseline conditions for eye movement and head position to compare positional data received from sensors 102. In further embodiments, the baseline model may include baseline conditions that enable IA computing device 104 to compare a driver's head or view angle to reference samples stored in database 404. For example, a candidate head placement (e.g., of a first driver of a first vehicle) may be compared, by IA computing device 104 to a set of head positions and head angles associated with an alert driver of a specific body frame (e.g., height). Additionally or alternatively, IA computing device 104 may use baseline conditions for vehicle dynamics to compare steering input information received from sensors 102. In some embodiments, the baseline model may include data from the National Transportation Safety Board or the National Highway Traffic Safety Administration.

IA computing device 104 may also determine 706 that the second vehicle poses a driving hazard (e.g., impairment) to the first vehicle based upon the analysis. The driving hazard may be due to an operator impairment of the second driver and/or a vehicle impairment of the second vehicle. IA computing device 104 may compare the second vehicle data to the baseline model and determine whether the second vehicle data meets or exceeds one or more baseline conditions. For example, IA computing device 104 may determine that the second vehicle is impaired, or otherwise operating abnormally, by detecting that the second vehicle is traveling at a speed outside a range set by the baseline condition, such as outside speed range established by traffic flow, traffic density, type or road, or posted speed limit.

In other embodiments, IA computing device 104 may compare the second vehicle data to the baseline model and determine whether the second vehicle data exceeds a first threshold, such as a speed threshold for a given location or posted speed limit. IA computing device 104 may categorize the second vehicle data as a low driving hazard if the second vehicle data does not exceed the first threshold. In these embodiments, IA computing device 104 may determine if the second vehicle data exceeds multiple thresholds (e.g., second threshold, third threshold), and categorize the second vehicle data accordingly as a low, medium, or high driving hazard.

IA computing device may generate 708 an alert signal based upon the determination that the second vehicle poses a driving hazard to the first vehicle. IA computing device 104 may determine that the second vehicle poses a driving hazard to the first vehicle if IA computing device 104 detects second vehicle data that is categorized as a medium or high driving hazard. In these embodiments, IA computing device 104 may not output an alert signal for second vehicle data categorized as low driving hazards. In other embodiments, IA computing device 104 may determine that the second vehicle poses a driving hazard if the second vehicle data meets or falls outside the baseline conditions of the baseline model. In the exemplary embodiment, IA computing device 104 may generate the alert signal to first vehicle by transmitting the alert signal to a first vehicle controller (e.g., similar to host vehicle controller 108 as shown in FIG. 1).

The first vehicle controller may instruct one or more of an auditory signal generator, visual signal generator, and haptic signal generator to output an auditory, visual, and/or haptic warning alert (similar to FIG. 2). In some embodiments, IA computing device 104 may output multiple alert signals depending on how the second vehicle data is categorized (e.g., high driving hazard). IA computing device 104 may simultaneously output an auditory, visual, and haptic signal to alert the first driver.

In certain embodiments where first vehicle and second vehicle have autonomous or semi-autonomous vehicle related functionalities that enable vehicle-to-vehicle (V2V) communication, IA computing device 104 may generate the alert signal to the second vehicle by sending an alert message through the V2V communication network. More specifically, IA computing device 104 may transmit an alert message to second vehicle controller (similar to target vehicle controller 208 as shown in FIG. 2), which may prompt at least one of auditory signal generator 210, visual signal generator 212, and haptic signal generator 214 of the second vehicle to generate a warning alert to warn the second driver.

In some further embodiments, IA computing device 104 may store the baseline model in at least one memory device. In these embodiments, the baseline model may include the baseline conditions representing safe driving conditions and standard vehicle maintenance conditions. In other embodiments, IA computing device 104 may store the second vehicle data in at least one memory device. In these embodiments, IA computing device may transmit the second vehicle data to a remote-computing device to update at least one of an underwriting model and an actuarial model. The second vehicle data may be used to adjust an insurance policy of an insurance holder such as the insurance policy of a target driver. In certain embodiments, the sensor data may be used to determine the statistics surrounding impaired drivers and/or impaired vehicles based upon factors such as location (e.g., city, suburb, rural area, urban area), time of day (e.g., morning, midnight), day of week (e.g., weekend, weekday, holiday), vehicle makes and types (e.g., sports vehicles, trucks, minivans), and traffic patterns (e.g., rush hour). Modeling data may be extrapolated from the sensor data to evaluate risk associated with impaired drivers and/or impaired vehicles.

Figure 7B:
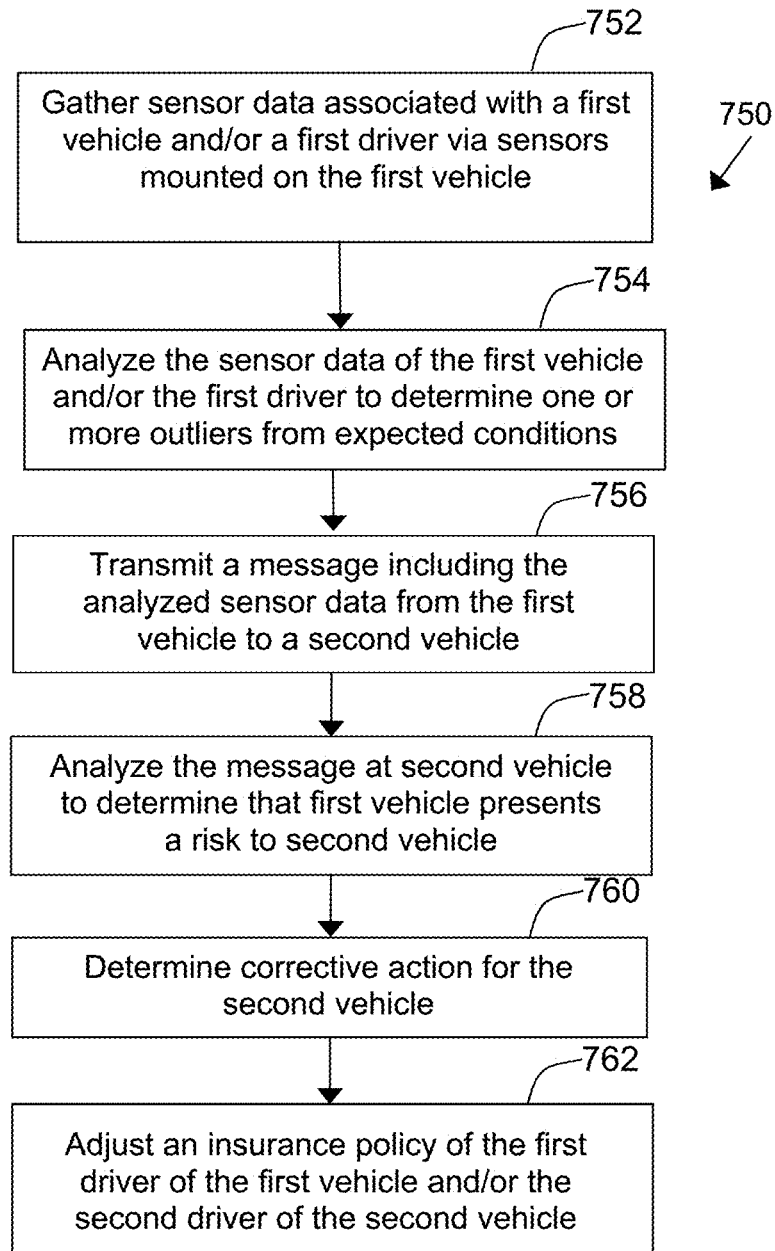
FIG. 7B illustrates a flow chart of an exemplary process of determining whether a first or oncoming vehicle presents a collision risk to a second vehicle.

FIG. 7B illustrates a flow chart of another exemplary computer-implemented process 750 for one aspect of determining whether host vehicle 100 (e.g., first vehicle) poses a driving hazard to target vehicle 204 (e.g., second vehicle) using system 400 (shown in FIG. 4). Process 750 may be implemented by a computing device, for example impairment analysis ("IA") computing device 104 (shown in FIG. 1). In particular, the first vehicle and the second vehicle as illustrated by FIG. 7B possess autonomous or semi-autonomous technology or functionality that enables the first vehicle to communicate with the second vehicle.

In the exemplary embodiment, IA computing device 104 may gather 752 sensor data associated with the first vehicle (such as host vehicle 100) and/or a first driver (e.g., host driver 106) of the first vehicle via vehicle-mounted sensors. The sensor data may include image, audio, telematics (vehicle speed, braking, direction, cornering, etc.), and other sensor data associated with the first vehicle and/or the first driver. The sensor data may further include data as to the environment surrounding the first vehicle (e.g., environmental data) such as images of surrounding vehicles, pedestrians, roads, road signs, and/or traffic lights, as well as data associated with traffic conditions, road conditions, weather conditions, time of day, and/or location.

IA computing device 104 may analyze 754 the sensor data of the first vehicle and/or the first driver to determine one or more outliers (e.g., abnormalities, deviations) from expected conditions (e.g., baseline conditions). IA computing device 104 may continuously apply a baseline model to the sensor data to determine whether one or more outliers from the baseline model are present within the sensor data. The sensor data may include data as to lane maintenance (e.g., lane departure, lane deviation) and vehicle speed maintenance (e.g., variation in speed). The baseline model may include baseline conditions and/or data representing a range of parameters for lane position, lane maintenance, vehicle speed, and vehicle dynamics.

The baseline model may include thresholds to assess sensor data as to vehicle speed maintenance (and/or acceleration maintenance) and lane maintenance. For example, IA computing device 104 may determine whether a vehicle speed associated with the first vehicle remains relatively consistent (e.g., maintaining speed between 55-60 mph) or fluctuates rapidly (e.g., accelerating or decelerating in a relatively short period of time). IA computing device 104 may further determine whether the vehicle speed of the first vehicle presents a risk (e.g., presents an impairment) to surrounding vehicles such as the second vehicle. For example, the first vehicle may maintain a consistent speed, but IA computing device 104 may categorize the speed as a risk if the first vehicle is traveling 55 mph on a local street where surrounding vehicles such as the second vehicle are traveling at 25 mph. In this example, IA computing device 104 may determine that the first vehicle exceeds a first threshold that is based upon the posted speed limit, and subsequently determine that the first vehicle poses a medium or high risk to the second vehicle. However, if the first vehicle in this example continues to accelerate to 70 mph, IA computing device 104 may determine that the first vehicle exceeds a second and/or third threshold, and subsequently determine corrective action accordingly.

IA computing device 104 may further transmit 756 a message that includes the analyzed sensor data of the first vehicle and/or the first driver to a second vehicle (e.g., target vehicle 204) or other nearby vehicles via wireless communication or data transmission over one or more radio frequency links. In some embodiments, the message may provide information as to the type of risk (e.g., lane departure, weaving in and out of lanes, and speeding) and category of risk (e.g., low, medium, or high) presented by the first vehicle to the second vehicle. In further embodiments where the second vehicle has autonomous functionalities, the message may include a recommendation (or control signal) for a vehicle controller of the second vehicle, such as target vehicle controller 208 (shown in FIG. 2) to engage an automated safety system of the second vehicle such as an automatic or semi-automatic braking system, acceleration system, and/or steering system. For example, the message may indicate that the first vehicle poses a high risk to the second vehicle (e.g., speeding through a red light at a 4-way intersection), and may recommend that the second vehicle engage an automated steering system to avoid the first vehicle.

A controller or processor at the second vehicle such as target vehicle controller 208 (shown in FIG. 2) may analyze 758 the message received from the first vehicle (including analyzing image, audio, telematics, or other first vehicle sensor data) to determine that the first vehicle presents a risk to the second vehicle. For instance, the first driver (of the first vehicle) may be determined to be operating the vehicle abnormally or may be distracted, and/or the first vehicle speed, direction, and operation, such as determined from the first vehicle telematics data, may be determined to be abnormal or above a risk threshold. In one embodiment, telematics data from the first vehicle (e.g., analyzed sensor data) may indicate lane drift or variation in speed, which may indicate driver drowsiness or distraction. In certain embodiments, the controller or processor of the second vehicle may compare the analyzed sensor data of the received message to sensor data collected by sensors mounted on the second vehicle.

Process 750 may further include determining 760 one or more corrective actions (e.g., collision avoidance actions) for the second vehicle. In some embodiments, the second vehicle may take action based upon a recommendation (included in the transmitted message) generated by the IA computing device 104 in the first vehicle. In other embodiments, the second vehicle may generate an alert (e.g., auditory, visual, and/or haptic) to a second driver of the second vehicle and/or recommend that one or more safety feature be engaged by the second driver. In further embodiments where the second vehicle possesses autonomous functionalities, the second vehicle may automatically engage an automated safety system of the second vehicle such as an automatic braking system, acceleration system, and/or steering system.

An insurance provider may collect the sensor data, and data associated with operation of the first vehicle and/or the second vehicle to adjust 762 an insurance policy of the first driver and/or the second driver. For example, an insurance discount may be provided for the second driver (of the second vehicle) based upon the second vehicle being equipped with the foregoing functionality and other functionality discussed herein. Process 750 may include addition, less, or alternate actions, including those discussed elsewhere herein.

Although as described herein, data is collected for the first vehicle, this is for exemplary purposes only. Data may also be collected by the second vehicle and provided to IA computing device 104 of the first vehicle, enabling IA computing device 104 to determine whether to provide an alert or take control of the first vehicle.

Exemplary Sensor Embodiment

Figure 8:
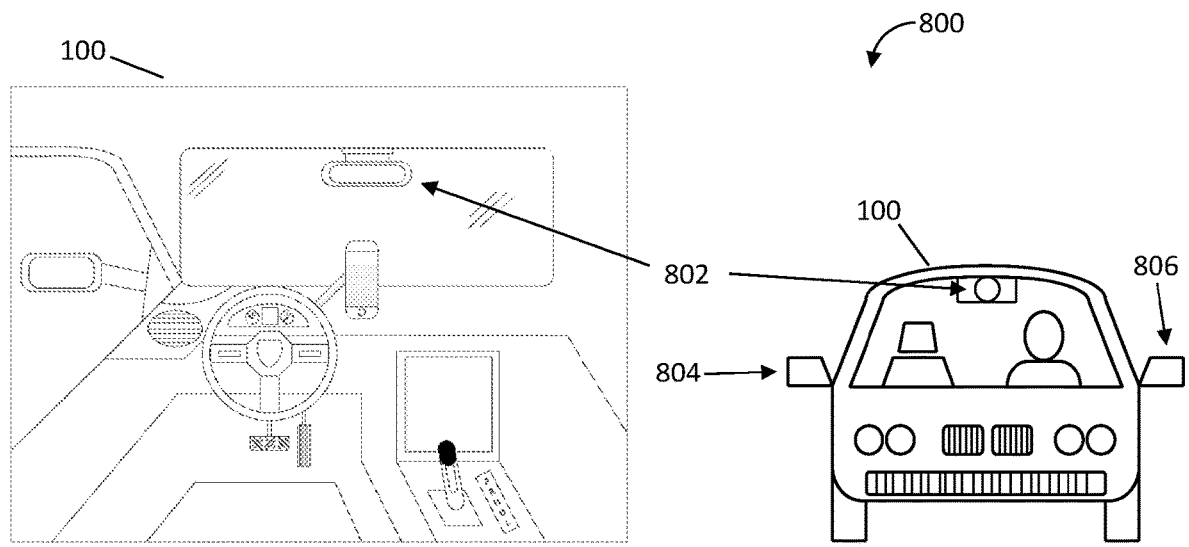
FIG. 8 illustrates an exemplary embodiment of a sensor positioned on a host vehicle (e.g., first vehicle) such as the host vehicle shown in FIG. 1, for detecting an impairment with a target vehicle and/or a target driver, in accordance with one embodiment of the present disclosure.

FIG. 8 depicts an exemplary sensor embodiment 800 on host vehicle (e.g., first vehicle) 100 (shown in FIG. 1) in accordance with one embodiment of the present disclosure. Sensor embodiment 800 shows one version of arranging the plurality of sensors 102 (shown in FIG. 1) on host vehicle 100 to capture data of target vehicle (e.g., second vehicle) 204.

In the exemplary embodiment, sensors 102 on host vehicle 100 may include a plurality of cameras, such as front camera 802, right camera 804, and left camera 806. Cameras 802, 804, and 806 are outward-facing cameras that continuously capture high quality images and/or video necessary for analysis by IA computing device 104. Cameras 802, 804, and 806 may possess video recording capabilities, and may record continuously while the ignition of host vehicle 100 is powered on. In the exemplary embodiment, front camera 802 may be positioned on the rearview mirror of host vehicle 100. In some embodiments, front camera 802 may be positioned near the rearview mirror on the dashboard of host vehicle 100.

Front camera 802 may be a front view camera capable of capturing data of both oncoming vehicles and the drivers of the oncoming vehicles (e.g., opposing drivers). Right camera 804 and left camera 806 may be side view cameras capable of capturing vehicle condition data and driver data of vehicles of parallel traffic. Cameras 804 and 806 may be positioned at or near the side mirrors of host vehicle 100. Similar to front camera 802, right camera 804 and left camera 806 may be positioned at an angle that enables cameras 804 and 806 to capture vehicle and driver data. In some embodiments, host vehicle 100 may utilize a front view camera, such as front camera 802, and only one side view camera (right camera 804 or left camera 806).

In the exemplary embodiment, IA computing device 104 assesses the data from cameras 802, 804, and 806 to determine impairment (e.g., operator impairment, vehicle impairment). In other embodiments, the data from cameras 802, 804, and 06 may be analyzed by IA computing device 104 to determine if target vehicle (e.g., second vehicle) poses a driving hazard to host vehicle (e.g., first vehicle) 100. Data captured from cameras 802, 804, and 806 may simultaneously be transmitted to IA computing device 104 for filtering and analysis. In other embodiments, data achieving a certain threshold (e.g., minimum image/video quality necessary for analysis) may be transmitted to IA computing device 104 for analysis.

In other embodiments, additional sensors may be included on host vehicle 100. For example, host vehicle 100 may include sensors such as LIDAR, radar, and/or ultrasound in addition to cameras 802, 804, and 806. In some embodiments, host vehicle 100 may include additional cameras positioned at different locations on the dashboard and/or on the sides of host vehicle 100. In other embodiments, host vehicle 100 may include rear view facing cameras positioned in the rear of host vehicle 100 to capture data of oncoming vehicles approaching from the back. Additionally or alternatively, host vehicle 100 may also use a 3D camera (e.g., depth-discerning/depth camera).

Exemplary Use Case

Figure 9:
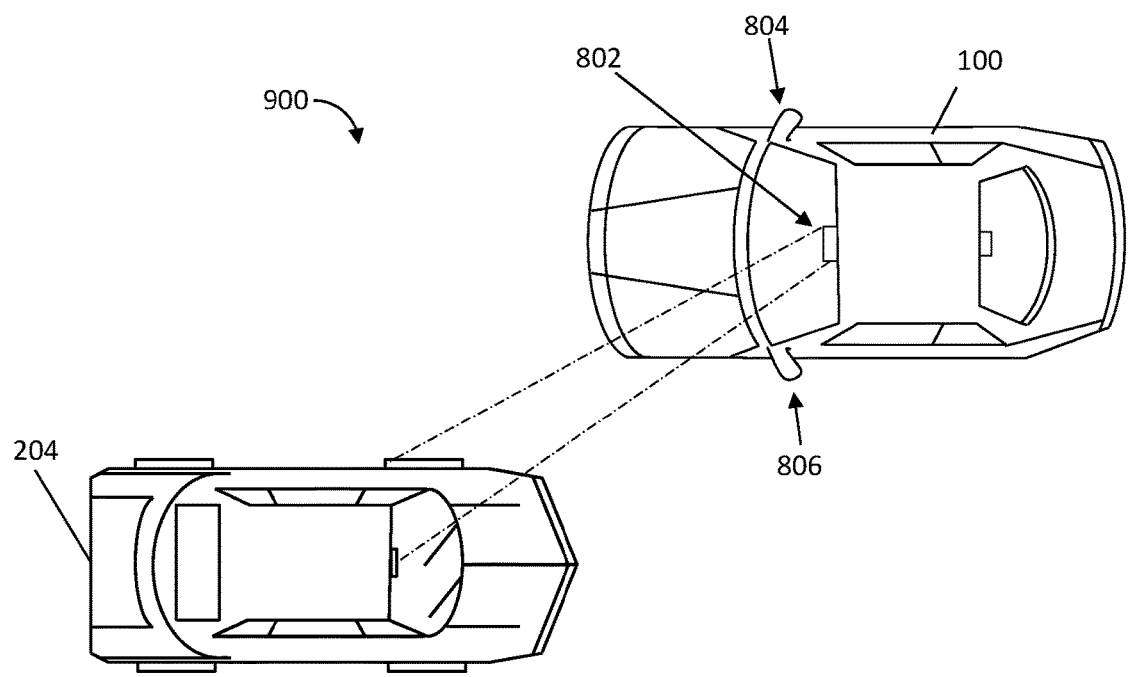
FIG. 9 illustrates an exemplary use case of the exemplary sensor shown in FIG. 8 using the computer system shown in FIG. 4, in accordance with one embodiment of the present disclosure.

FIG. 9 illustrates an exemplary use case 900 of the exemplary sensor embodiment 800 shown in FIG. 8 using system 400 (shown in FIG. 4) to capture sensor data of oncoming traffic. In particular, exemplary use case 900 illustrates the implementation of front camera 802 to capture data of target vehicle 204.

In the exemplary embodiment, front camera 802 may be positioned on the rearview mirror of host vehicle 100 (as shown in FIG. 8). Front camera 802 may be oriented in a position and angle that enables optimal data capture for analysis by IA computing device 104 (shown in FIG. 1). Cameras 802, 804, and 806 may be configured to detect positional data of the target driver. In the exemplary embodiment, front camera 802 is a front view camera that may be configured to capture data of oncoming vehicles.

Front camera 802 may be configured to capture the target driver's positional data, such as eye movement, head orientation, neck movement, and body posture. Front camera 802 may also be configured to capture at least one of the target driver's shoulder movement, gaze direction, blinking frequency/duration, head motion (e.g., head nodding, rolling, shaking), arm position, facial expressions, and/or behavioral movements, such as yawning and eating/drinking. In the exemplary embodiment, front camera 802 may also be configured to capture the surrounding imagery, and collect information such as the time of day, location, weather condition, traffic condition, and road condition. Front camera 802 may also be configured to capture vehicle speed, lane edges and markings of target vehicle 204, and driving behavior such as braking (e.g., hard braking, aggressive starts). Front camera 802 may also be configured to capture vehicle condition data of target vehicle 204, and collect information pertaining to vehicle make/model, engine, tires, and vehicle maintenance. In other embodiments, host vehicle 100 may have additional cameras and/or image capturing sensors accompanying front camera 802 at the front of host vehicle 100.

Another Exemplary Use Case

Figure 10:
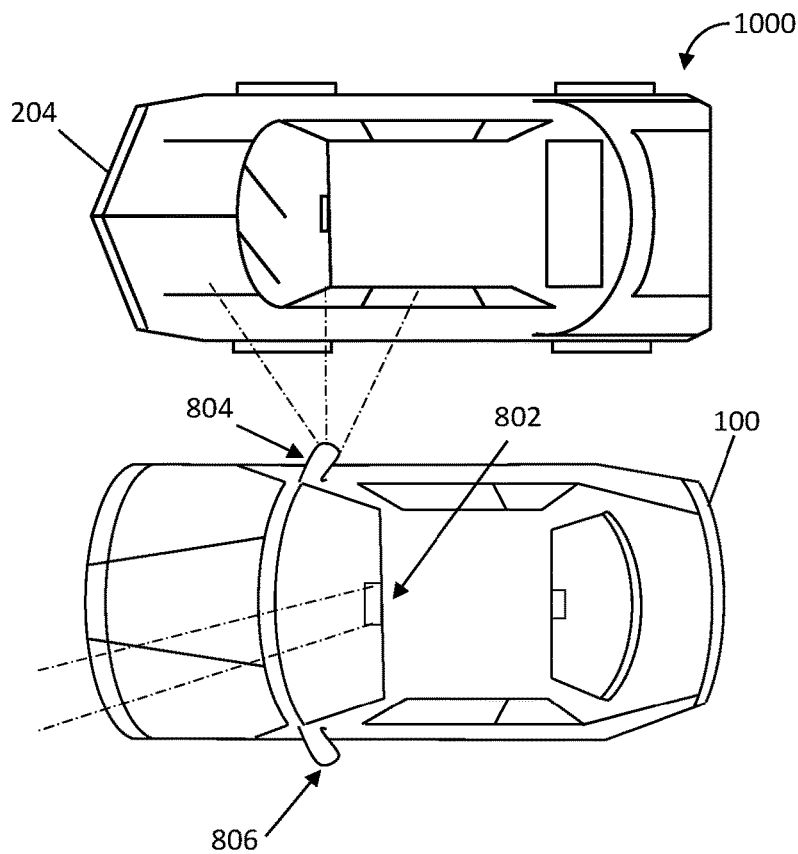
FIG. 10 illustrates another exemplary use case of the exemplary sensor shown in FIG. 8 using the computer system shown in FIG. 4, in accordance with one embodiment of the present disclosure.

FIG. 10 illustrates another exemplary use case 1000 of implementing the exemplary sensor embodiment 800 shown in FIG. 8 using system 400 (shown in FIG. 4) to capture sensor data of parallel traffic. In particular, exemplary use case 1000 illustrates the implementation of right camera 804 and left camera 806 of host vehicle 100 to capture data of target vehicle 204.

Exemplary use case 1000 is a top view of the exemplary sensor embodiment 800 shown in FIG. 8. In the exemplary embodiment, right camera 804 may be located on the passenger side view mirror. Right camera 804 may be configured to capture data pertaining to vehicles traveling in the right lane alongside host vehicle 100. In the exemplary embodiment, left camera 806 may be located on the driver side view mirror. Left camera 806 may be configured to capture data pertaining to vehicles traveling in the left lane alongside host vehicle 100. Cameras 804 and 806 may be positioned at different locations on the passenger side and/or driver side of host vehicle 100 for optimal data collection.

Similar to front camera 802, right camera 804 and left camera 806 may be configured to capture the target driver's positional data, such as head orientation, neck movement, and body posture. In some embodiments, cameras 804 and 806 may also be configured to detect and capture the target driver's eye movement, blinking frequency/duration, and facial expressions from a side view. In these embodiments, IA computing device 104 may be equipped with a baseline model that sets out conditions for side eye movement and facial detection to assess sensor data captured from left camera 806 and right camera 804.

Similar to front camera 802, right camera 804 and left camera 806 may also be configured to capture at least one of the target driver's shoulder movement, gaze direction, blinking frequency/duration, head motion (e.g., head nodding, rolling, shaking), arm position, and/or behavioral movements, such as yawning and eating/drinking. Cameras 804 and 806 may also be configured to capture the surrounding imagery, vehicle speed, lane edges and markings of target vehicle 204, driving behavior such as braking (e.g., hard braking, aggressive starts), and vehicle condition data of target vehicle 204, such as information pertaining to vehicle make/model, engine, tires, and vehicle maintenance. In the exemplary embodiment, front camera 802 may be configured to capture data of oncoming vehicles in real time as left camera 806 and right camera 804 capture data of parallel vehicles to the left and right of host vehicle 100.

Secondary View of Exemplary Use Case

Figure 11:
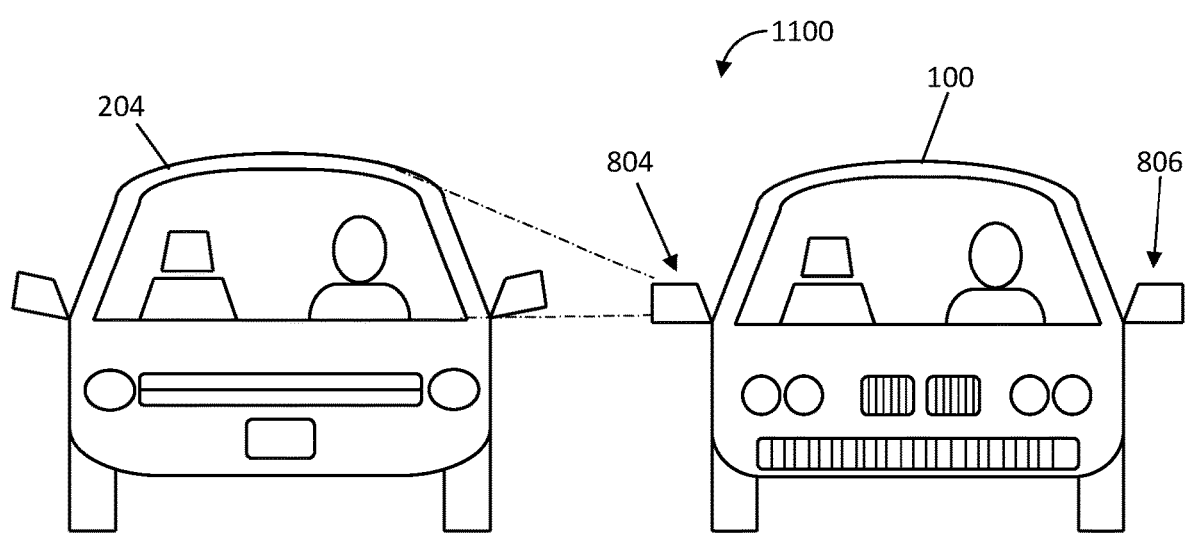
FIG. 11 illustrates a secondary view of the exemplary use case shown in FIG. 10, in accordance with one embodiment of the present disclosure.

FIG. 11 illustrates a secondary view 1100 of exemplary use case 1000 (shown in FIG. 10). In particular, FIG. 11 illustrates a front view of host vehicle 100 and target vehicle 204 as right camera 804 of the exemplary sensor embodiment 800 (shown in FIG. 8) uses system 400 (shown in FIG. 4) to capture sensor data of a parallel vehicle.

In the exemplary embodiment, right camera 804, which is positioned on the passenger side of host vehicle 100, may be configured to scan the target driver of target vehicle 204 to capture positional data pertaining to the target driver. In some embodiments, right camera 804 may be configured to scan a wider area of the driver side of target vehicle 204. For example, right camera 804 may be configured to scan (i) the driver window of target vehicle 204 to acquire positional data of the target driver, and (ii) the entire driver side of target vehicle 204 (e.g., front tire, driver door, and roof) to acquire vehicle condition data.

In the exemplary embodiment, left camera 806, which is positioned on the driver side of host vehicle 100, may be configured to scan the vehicles traveling in the left lane alongside host vehicle 100. Similar to right camera 804, left camera 806 may be configured to capture positional data pertaining to the target driver in the left lane. In some embodiments, left camera 806 may be equipped with sensing and focusing technology that enables left camera 806 to identify and recognize the target driver from a greater distance. In other embodiments, left camera 806 may include capabilities that enable left camera 806 to recognize the target driver in the left lane and acquire data when the passenger seat of target vehicle 204 is occupied. In these embodiments, left camera 806 may be a 3D (depth-focusing camera). Left camera 806 may also be accompanied by one or more additional cameras or image-capturing devices that enable IA computing device 104 (shown in FIG. 1) to acquire positional data and vehicle condition data of target vehicle 204 traveling in the left lane.

Exemplary Computer Device

Figure 12:
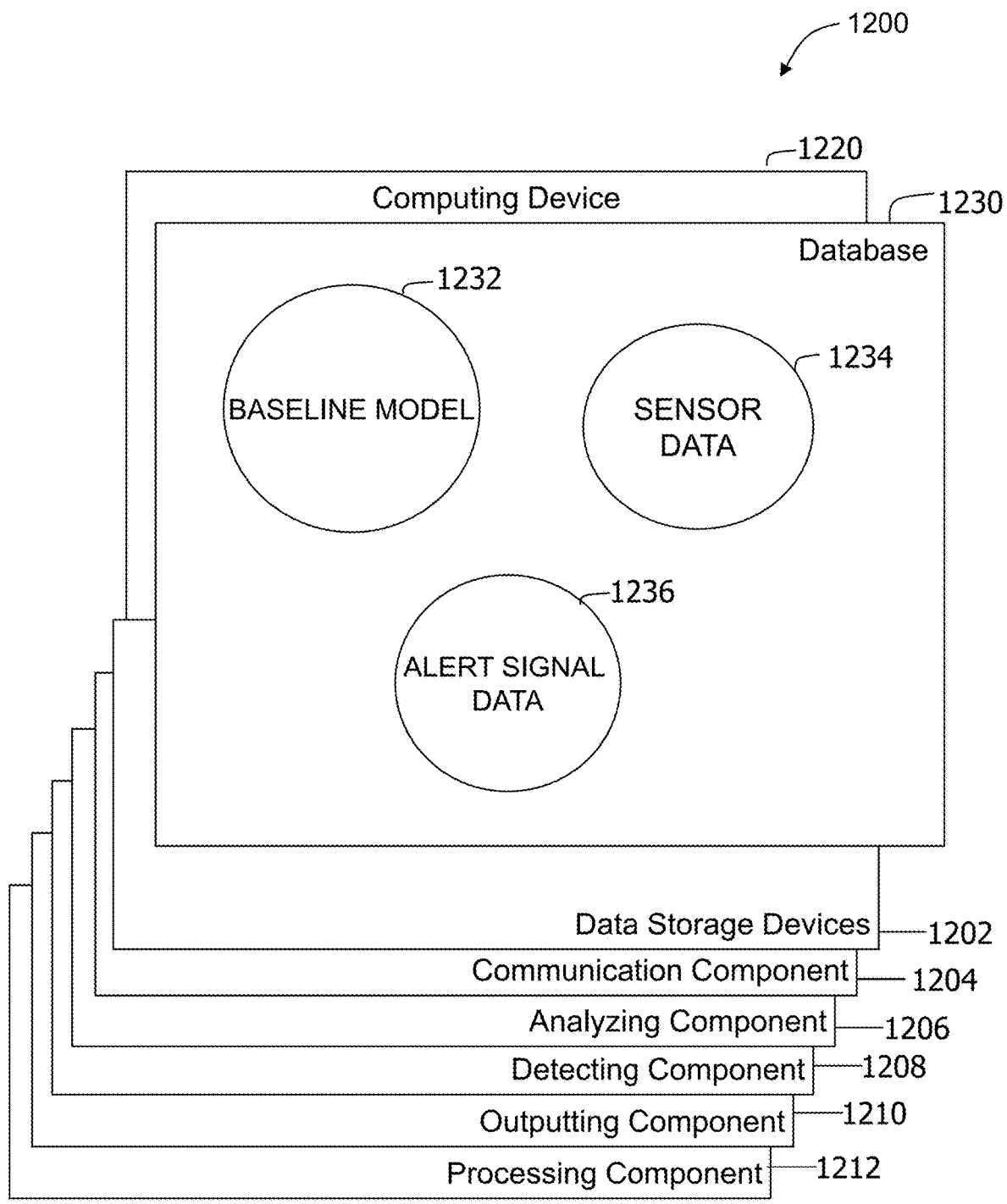
FIG. 12 illustrates a diagram of components of one or more exemplary computing devices that may be used in the computer system shown in FIG. 4.

FIG. 12 depicts a diagram 1200 of components of one or more exemplary computing devices 1220 that may be used in system 400 shown in FIG. 4. In some embodiments, computing device 1220 may be similar to IA computing device 104 (shown in FIG. 1). Database 1230 may be coupled with several separate components within computing device 1220, which perform specific tasks. In this embodiment, database 1230 may include the baseline model 1232, which includes the baseline conditions. Database 1230 may also include sensor data 1234. Sensor data 1234 may include vehicle condition data of target vehicle 204, and driver data, such as positional data of the target driver. In some embodiments, database 1230 is similar to database 404 (shown in FIG. 4).

Computing device 1220 may include database 1230, as well as data storage devices 1202. Computing device 1220 may also include a communication component 1204 for interrogating 302 target vehicle 204 and receiving 304 sensor data (both shown in FIG. 3). In some embodiments, communication component 1204 may be for receiving 702 second vehicle data (shown in FIG. 7). Computing device 1220 may further include an analyzing component 1206 for analyzing 306 the sensor data (shown in FIG. 3). In some embodiments, analyzing component 1206 may be for analyzing 704 the second vehicle data (shown in FIG. 7). Moreover, computing device 1220 may include a detecting component 1208 for detecting 308 an impairment (shown in FIG. 3). In some embodiments, detecting component 1208 may be for determining 706 that a second vehicle poses a driving hazard to a first vehicle (shown in FIG. 7).

Computing device 1220 may further include an outputting component 1210 for outputting 310 an alert signal (shown in FIG. 3). In some embodiments, outputting component 1210 may be for generating 708 an alert signal (shown in FIG. 7). A processing component 1212 may assist with execution of computer-executable instructions associated with the system.

Exemplary Embodiments & Functionality

In one aspect, an impairment analysis ("IA") computer system for detecting a driver and/or vehicle impairment to facilitate vehicle collision avoidance may be provided. The IA computer system may be associated with a host vehicle. The IA computer system may include a plurality of sensors and at least one processor in communication with the plurality of sensors and at least one memory device. The at least one processor may be configured or programmed to: (1) interrogate a target vehicle via a plurality of sensors by scanning at least one of the target vehicle and a target driver of the target vehicle; (2) receive sensor data including at least one of target driver data and target vehicle condition data; (3) analyze the sensor data by determining at least one outlier within the sensor data; (4) detect an impairment of at least one of the target driver and the target vehicle based upon the analysis; and/or (5) direct corrective action based upon the impairment of the at least one of the target driver and the target vehicle.

A further enhancement may be where the at least one outlier deviates from a model stored in the at least one memory device. The model may represent safe driving parameters and standard vehicle maintenance conditions.

A further enhancement may be where the computer system directs corrective action by generating an alert at the host vehicle. The alert may be at least one of an auditory alert, a visual alert, and a haptic alert.

A further enhancement may be where the computer system directs corrective action by automatically engaging an automated safety system of the host vehicle. The automated safety system may be at least one of an automated braking system and an automated steering system.

A further enhancement may be where the computer system directs corrective action by generating a recommendation at the host vehicle to engage an automated safety system of the host vehicle. Engaging the automated safety system may reduce a probability of colliding with the target vehicle.

A further enhancement may be where the computer system directs corrective action by automatically engaging at least one of an autonomous vehicle control system and a semi-autonomous vehicle control system of the host vehicle.

A further enhancement may be where the computer system directs corrective action by generating a recommendation at the host vehicle to engage at least one of an autonomous vehicle system and a semi-autonomous vehicle system of the host vehicle.

A further enhancement may be where the host vehicle operates in at least one of a semi-autonomous control mode and an autonomous control mode. The at least one processor may further programmed to direct corrective action by instructing a vehicle control system of the host vehicle to steer the host vehicle away from a path of the target vehicle.

A further enhancement may be where the impairment is based upon a deviation in at least one of speed maintenance and lane maintenance of the target vehicle.

In another aspect, an impairment analysis ("IA") computer system for detecting an impairment may be provided. The IA computer system may be associated with a host vehicle. The IA computing system may include at least one processor in communication with at least one memory device. The at least one processor may be configured or programmed to: (1) interrogate a target vehicle by using a plurality of sensors included on a host vehicle to scan the target vehicle and a target driver; (2) receive sensor data including target driver data and target vehicle condition data; (3) analyze the sensor data by applying a baseline model to the sensor data; (4) detect an impairment of the target driver or target vehicle based upon the analysis; and/or (5) output an alert signal to a host vehicle controller, or direct other collision avoidance actions (such as engage an autonomous or semi-autonomous vehicle system or other automated safety feature), based upon the determination that the target driver or target vehicle is impaired.

A further enhancement may be where the sensor data includes video data from a plurality of cameras. The plurality of cameras are configured to detect positional data. The positional data may include at least one of eye movement, head orientation, neck position, and body posture of the target driver of the target vehicle.

A further enhancement may be where the IA computer system stores the baseline model in the at least one memory device. The baseline model may include baseline conditions representing safe driving conditions and standard vehicle maintenance conditions.

A further enhancement may be where the alert signal is at least one of an auditory, a visual signal, and a haptic signal.

A further enhancement may be where the IA computer system outputs the alert signal to at least one of a target vehicle controller and a vehicle controller of a surrounding vehicle. A further enhancement may be where scanning includes at least one of repeated visual scanning by the plurality of sensors, and receiving a wireless communication by the plurality of sensors.

A further enhancement may be where the target driver data is associated with the target driver, and includes information pertaining to at least one of speed, vehicle lane maintenance (e.g., lane drifting), braking, and posture. The information pertaining to posture (e.g., positional data) may include data related to head orientation, body posture, and eye movement. A further enhancement may be where the target vehicle condition data is associated with the target vehicle, and includes information pertaining to at least one of vehicle maintenance, engine condition, and road condition.

A further enhancement may be where the plurality of sensors includes a wireless communications device. Receiving the sensor data by the IA computer system may include receiving, at the wireless communications device, an alert message from the target vehicle.

A further enhancement may be where the IA computer system (i) stores the sensor data in the at least one memory device, and (ii) transmits the sensor data to a remote-computing device to update at least one of an underwriting model and an actuarial model. The sensor data may be used to adjust an insurance policy of an insurance holder.

In another aspect, an impairment analysis ("IA") computer system for alerting a first driver of a first vehicle to a driving hazard posed by a second vehicle may be provided. The IA computer system may be associated with the first vehicle, and may include at least one processor in communication with at least one memory device. The at least one processor may be programmed to: (1) receive second vehicle data including second driver data and second vehicle condition data, wherein the second vehicle data is collected by a plurality of sensors included on the first vehicle; (2) analyze the second vehicle data by applying a baseline model to the second vehicle data; (3) determine that the second vehicle poses a driving hazard to the first vehicle based upon the analysis; and/or (4) generate an alert signal based upon the determination that the second vehicle poses a driving hazard to the first vehicle.

A further enhancement may be where the second vehicle data includes video data from a plurality of cameras. The plurality of cameras may be configured to detect positional data. The positional data may include at least one of eye position, head position, neck position, and body posture of the second driver of the second vehicle.

A further enhancement may be where the IA computer system stores the baseline model in the at least one memory device. The baseline model may include baseline conditions representing safe driving conditions and standard vehicle maintenance conditions.

A further enhancement may be where the driver data is associated with the second driver, and may include information pertaining to at least one of speed, vehicle lane maintenance (e.g., lane drifting), braking, and posture. The information pertaining to posture (e.g., positional data) may include data related to head position, body position, and eye position. A further enhancement may be where the vehicle condition data is associated with the second vehicle, and includes information pertaining to at least one of vehicle maintenance, engine condition, and road condition.

A further enhancement may be where the alert signal is at least one of an auditory signal, a visual signal, and a haptic signal. A further enhancement may be where the IA computer system further outputs the alert signal to at least one of a second vehicle controller and a vehicle controller of a surrounding vehicle.

A further enhancement may be where scanning includes at least one of repeated visual scanning by the plurality of sensors, and receiving a wireless communication by the plurality of sensors. A further enhancement may be where the plurality of sensors includes a wireless communications device. Receiving the second vehicle data by the IA computer system may include receiving, at the wireless communications device, an alert message from the second vehicle.

A further enhancement may be where the IA computer system (i) stores the second vehicle data in the at least one memory device, and (ii) transmits the second vehicle data to a remote-computing device to update at least one of an underwriting model and an actuarial model. The second vehicle data may be used to adjust an insurance policy of an insurance holder.

In another aspect, an impairment analysis ("IA") computer system for detecting a driver or vehicle impairment may be provided. The IA computer system may be associated with a host vehicle, and may include a plurality of sensors. The IA computer system may include at least one processor in communication with the plurality of sensors and at least one memory device. The at least one processor may be programmed to: (1) interrogate a target vehicle, wherein the target vehicle operates in at least one of a semi-autonomous control mode and an autonomous control mode, and wherein the target vehicle may communicate in real-time with the host vehicle; (2) receive, from the target vehicle, sensor data including target driver data and target vehicle condition data; (3) analyze the sensor data by applying a model stored in the IA computer system to the sensor data; (4) detect an impairment of the target driver or target vehicle based upon the analysis; and/or (5) output an alert signal to a host vehicle controller based upon detecting that the target driver or target vehicle is impaired, or otherwise exhibiting abnormal driving behavior or operating abnormally, respectively.

In yet another aspect, a computer system for collecting real-time impaired driving data may be provided. The computer system may include a plurality of sensors. The computer system may further include at least one processor in communication with the plurality of sensors and at least one memory device. The at least one processor may be programmed to: (1) interrogate a target vehicle via the plurality of sensors by scanning the target vehicle and/or a target driver of the target vehicle; (2) receive sensor data including target driver data and/or target vehicle condition data; (3) analyze the sensor data by applying a baseline model to the sensor data; (4) detect an impairment of the target driver and/or target vehicle based upon the analysis, wherein the impairment is one of at least a high-risk impairment and a low-risk impairment; and/or (5) transmit the detected impairment to a remote-computing device to update an insurance policy of an insurance holder.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, historical estimates, and/or actual repair costs. The machine learning programs may utilize deep learning algorithms that may be primarily focused on pattern recognition, and may be trained after processing multiple examples. The machine learning programs may include Bayesian Program Learning (BPL), voice recognition and synthesis, image or object recognition, optical character recognition, and/or natural language processing—either individually or in combination. The machine learning programs may also include natural language processing, semantic analysis, automatic reasoning, and/or machine learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the object, vehicle, user, damage, needed repairs, costs and/or incident from vehicle data, insurance policies, geolocation data, image data, and/or other data.

Based upon these analyses, the processing element may learn how to identify characteristics and patterns that may then be applied to analyzing image data, model data, and/or other data. For example, the processing element may learn, with the user's permission or affirmative consent, to identify the type of incident that occurred based upon images of the resulting damage. The processing element may also learn how to identify damage that may not be readily visible based upon the received image data.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. An impairment analysis ("IA") computer system for detecting vehicular impairment to facilitate vehicle collision avoidance, the IA computer system associated with a host vehicle, the IA computer system comprising a plurality of sensors, and at least one processor in communication with the plurality of sensors and at least one memory device, the at least one processor is programmed to:
   interrogate a target vehicle via the plurality of sensors by scanning the target vehicle;
   receive sensor data including target vehicle condition data and target vehicle operation data, the target vehicle condition data including data representing a current engine condition of the target vehicle, target vehicle operation data including data representing a current operation of the target vehicle;
   analyze the sensor data by applying the sensor data to a baseline model representing standard vehicle operation and maintenance conditions for the target vehicle, wherein the baseline model accounts for a current location of the target vehicle, current driving conditions experienced by the target vehicle, and a current time when the sensor data was captured, and wherein the baseline model identifies a level of vehicular impairment indicating a likelihood that a vehicle collision will occur between the target vehicle and the host vehicle;
   detect a vehicular impairment of the target vehicle based upon the analysis by identifying at least one data outlier within the sensor data that indicates the vehicle impairment;
   identify the level of vehicular impairment from the analysis of the sensor data by the baseline model;
   transmit the detected vehicular impairment and the level of vehicular impairment of the target vehicle to a remote-computing device to update an insurance policy of an insurance holder; and
   direct corrective action based upon the vehicular impairment and the level of vehicular impairment of the target vehicle.

2. The system of claim 1, wherein the at least one processor is further programmed to direct corrective action by generating an alert at the host vehicle, and wherein the alert is at least one of an auditory alert, a visual alert, and a haptic alert.

3. The system of claim 1, wherein the at least one processor is further programmed to direct corrective action by automatically engaging an automated safety system of the host vehicle, and wherein the automated safety system is at least one of an automated braking system and an automated steering system.

4. The system of claim 1, wherein the at least one processor is further programmed to direct corrective action by generating a recommendation at the host vehicle to engage an automated safety system of the host vehicle, and wherein engaging the automated safety system reduces a probability of colliding with the target vehicle.

5. The system of claim 1, wherein the at least one processor is further programmed to direct corrective action by automatically engaging at least one of an autonomous vehicle control system and a semi-autonomous vehicle control system of the host vehicle.

6. The system of claim 1, wherein the at least one processor is further programmed to direct corrective action by generating a recommendation at the host vehicle to engage at least one of an autonomous vehicle system and a semi-autonomous vehicle system of the host vehicle.

7. The system of claim 1, wherein the host vehicle operates in at least one of a semi-autonomous control mode and an autonomous control mode, and wherein the at least one processor is further programmed to direct corrective action by instructing a vehicle control system of the host vehicle to steer the host vehicle away from a path of the target vehicle.

8. The system of claim 1, wherein the vehicular impairment is based upon a deviation in at least one of speed maintenance and lane maintenance of the target vehicle and wherein each level of vehicular impairment is associated with at least one different corrective action.

9. The system of claim 1, wherein the at least one processor is further programmed to:
   interrogate a target driver of the target vehicle receive sensor data including target driver data of the target driver of the target vehicle;
   analyze the sensor data by applying the sensor data to a baseline model representing safe driving parameters, wherein the safe driving parameters include at least a plurality of facial features and upper body positions associated with safe driving postures of a driver;
   detect an impairment of the target driver based upon the analysis; and
   direct corrective action based upon the impairment of the target driver.

10. A computer-implemented method for detecting vehicular impairment, the method implemented using an impairment analysis ("IA") computing device associated with a host vehicle, the IA computing device including at least one processor in communication with at least one memory device, the method comprising:
   interrogating, by the IA computing device, a target vehicle by using a plurality of sensors included on a host vehicle to scan a target vehicle;
   receiving, by the IA computing device, sensor data and including target vehicle condition data and target vehicle operation data, the target vehicle condition data including data representing a current engine condition of the target vehicle, target vehicle operation data including data representing a current operation of the target vehicle;
   analyzing, by the IA computing device, by applying the sensor data to a baseline model representing standard vehicle operation and maintenance conditions for the target vehicle, wherein the baseline model accounts for a current location of the target vehicle, current driving conditions experienced by the target vehicle, and a current time when the sensor data was captured, and wherein the baseline model identifies a level of vehicular impairment indicating a likelihood that a vehicle collision will occur between the target vehicle and the host vehicle;

detecting, by the IA computing device, a vehicular impairment of the target vehicle based upon the analysis by identifying at least one data outlier within the sensor data that indicates the vehicle impairment;

identifying the level of vehicular impairment from the analysis of the sensor data by the baseline model;

transmitting the detected vehicular impairment and the level of vehicular impairment of the target vehicle to a remote-computing device to update an insurance policy of an insurance holder; and directing, by the IA computing device, corrective action based upon the impairment and the level of vehicular impairment of the target vehicle.

11. The computer-implemented method of claim 10, wherein analyzing, by the IA computing device, comprises comparing the sensor data to the model to determine the at least one outlier.

12. The computer-implemented method of claim 10, wherein directing, by the IA computing device, corrective action based upon the impairment comprises generating an alert at the host vehicle, and wherein the alert is at least one of an auditory alert, a visual alert, and a haptic alert.

13. The computer-implemented method of claim 10, wherein directing, by the IA computing device, corrective action comprises automatically engaging an automated safety system of the host vehicle, the automated safety system including at least one of an automated braking system and an automated steering system.

14. The computer-implemented method of claim 10, wherein directing, by the IA computing device, corrective action comprises generating a recommendation at the host vehicle to engage an automated safety system of the host vehicle, and wherein engaging the automated safety system reduces a probability of colliding with the target vehicle.

15. The computer-implemented method of claim 10, wherein directing, by the IA computing device, corrective action comprises automatically engaging at least one of an autonomous vehicle control system and a semi-autonomous vehicle control system.

16. The computer-implemented method of claim 10, wherein directing, by the IA computing device, a corrective action comprises generating a recommendation at the host vehicle to engage at least one of an autonomous vehicle control system and a semi-autonomous vehicle control system of the host vehicle.

17. The computer-implemented method of claim 10, wherein the host vehicle operates in at least one of an autonomous control mode and a semi-autonomous control mode, and wherein directing, by the IA computing device, corrective action comprises instructing a vehicle control system of the host vehicle to steer the host vehicle away from a path of the target vehicle.

18. The computer-implemented method of claim 10, wherein the impairment is based upon a variation in at least one of speed and lane maintenance of the target vehicle.

19. The computer-implemented method of claim 10, wherein analyzing, by the IA computing device, by determining at least one outlier within the sensor data comprises determining whether a variation in at least one of speed and lane maintenance of the target vehicle exceeds a respective threshold and wherein each level of vehicular impairment is associated with at least one different corrective action.

20. The computer-implemented method of claim 10 further comprising:

interrogating a target driver of the target vehicle;

receiving sensor data including target driver data of the target driver of the target vehicle;

analyzing the sensor data by applying the sensor data to a baseline model representing safe driving parameters, wherein the safe driving parameters include at least a plurality of facial features and upper body positions associated with safe driving postures of a driver;

detecting an impairment of the target driver based upon the analysis; and directing corrective action based upon the impairment of the target driver.

* * * * *